US012578906B2

(12) United States Patent
Kim et al.

(10) Patent No.: US 12,578,906 B2
(45) Date of Patent: Mar. 17, 2026

(54) STORAGE VIRTUALIZATION DEVICE SUPPORTING VIRTUAL MACHINE, OPERATION METHOD THEREOF, AND OPERATION METHOD OF SYSTEM HAVING THE SAME

(71) Applicant: Mangoboost, Inc., Bellevue, WA (US)

(72) Inventors: Jangwoo Kim, Seoul (KR); Dongup Kwon, Seoul (KR)

(73) Assignee: Mangoboost, Inc.

( * ) Notice: Subject to any disclaimer, the term of this patent is extended or adjusted under 35 U.S.C. 154(b) by 842 days.

(21) Appl. No.: 17/504,849

(22) Filed: Oct. 19, 2021

(65) Prior Publication Data

US 2022/0137998 A1 May 5, 2022

(30) Foreign Application Priority Data

Nov. 3, 2020 (KR) ........................ 10-2020-0145193
Jul. 15, 2021 (KR) ........................ 10-2021-0092789

(51) Int. Cl.
*G06F 3/06* (2006.01)
*G06F 9/455* (2018.01)

(52) U.S. Cl.
CPC ........ *G06F 3/0664* (2013.01); *G06F 9/45558* (2013.01); *G06F 2009/45579* (2013.01); *G06F 2009/45583* (2013.01)

(58) Field of Classification Search
CPC ....... G06F 9/45558; G06F 2009/45579; G06F 2009/45583; G06F 3/0664
See application file for complete search history.

(56) References Cited

U.S. PATENT DOCUMENTS 11,252,232 B2 * 2/2022 Patel ................... H04L 67/1097
2015/0317088 A1 * 11/2015 Hussain ................ G06F 3/0688
711/103

(Continued)

FOREIGN PATENT DOCUMENTS

JP 2008152783 A 7/2008
JP 2020091554 A 6/2020
(Continued)

OTHER PUBLICATIONS

Dongup Kwon et al. "FVM: FPGA-assisted Virtual Device Emulation for Fast, Scalable, and Flexible Storage Virtualization" published 2020.

*Primary Examiner* — Jacob D Dascomb
(74) *Attorney, Agent, or Firm* — NKL LAW; Jae Youn Kim

(57) ABSTRACT

Disclosed is an operation method of a storage virtualization device which communicates with a host device and a storage device set, includes a first submission queue (SQ) and a first completion queue (CQ), and supports a first virtual machine executable by the host device. The method includes fetching a first command of a first virtual submission queue (VSQ) of the first virtual machine, distributing the first command thus fetched to the first SQ, providing the first command of the first SQ to the storage device set, receiving, from the storage device set, a first completion indicating that the first command is processed, wherein the first completion is written in the first CQ, distributing the first completion of the first CQ to a virtualization layer, and writing the first completion thus distributed to a first virtual completion queue (VCQ) of the first virtual machine.

18 Claims, 13 Drawing Sheets

(56) References Cited

U.S. PATENT DOCUMENTS

| 2017/0177222 | A1 | 6/2017 | Singh et al. | |
| 2018/0032249 | A1* | 2/2018 | Makhervaks | G06F 3/061 |
| 2018/0217951 | A1* | 8/2018 | Benisty | G06F 13/1642 |
| 2018/0307521 | A1* | 10/2018 | Pinto | G06F 12/0238 |
| 2020/0050470 | A1* | 2/2020 | Guo | G06F 3/0679 |
| 2020/0174673 | A1* | 6/2020 | Ikeda | G06F 3/0611 |

FOREIGN PATENT DOCUMENTS

| KR | 1020160022098 A | 2/2016 |
| KR | 1020160096279 A | 8/2016 |

* cited by examiner

STORAGE VIRTUALIZATION DEVICE SUPPORTING VIRTUAL MACHINE, OPERATION METHOD THEREOF, AND OPERATION METHOD OF SYSTEM HAVING THE SAME

CROSS-REFERENCE TO RELATED APPLICATIONS

This application claims priority under 35 U.S.C. § 119 to Korean Patent Application Nos. 10-2020-0145193 filed on Nov. 3, 2020 and 10-2021-0092789 filed on Jul. 15, 2021, in the Korean Intellectual Property Office, the disclosures of which are incorporated by reference herein in their entireties.

BACKGROUND

Embodiments of the present disclosure relate to management of a virtualized storage device, and more particularly, relate to a storage virtualization device supporting a virtual machine, an operation method thereof, and an operating method of a system including the same.

A storage virtualization technology may provide a virtual storage device to a virtual machine. The virtual machine may be a computing environment implemented by software, and an operating system or an application may be installed and executed on the virtual machine. The virtual storage device may be mapped onto a physical storage device (e.g., an actual storage device), and the physical storage device may physically store data for processing a request of the virtual machine, such as a read command or a write command.

To provide the virtual storage device to the virtual machine, a storage virtualization technology may support a virtualization layer. The virtualization layer may provide a resource management function (e.g., a data rate control or a bandwidth control) between the physical storage device and the virtual machine. In general, a virtual storage technology that is based on software may provide a flexible resource management function and a flexible virtual machine management function. However, the virtual storage technology may use a lot of resources of a central processing unit (CPU), thereby causing a decrease in a data rate. A virtual storage technology that is based on hardware may make the saving of resources of the CPU and an increase in a data rate possible but fails to provide a flexible resource management function and a flexible virtual machine management function.

SUMMARY

Embodiments of the present disclosure provide a storage virtualization device supporting a virtual machine, an operation method thereof, and an operating method of a system including the same.

According to an embodiment, an operation method of a storage virtualization device which communicates with a host device and a storage device set, includes a first submission queue (SQ) and a first completion queue (CQ), and supports a first virtual machine executable by the host device, includes fetching a first command of a first virtual submission queue (VSQ) of the first virtual machine, distributing the first command thus fetched to the first SQ, providing the first command of the first SQ to the storage device set, receiving, from the storage device set, a first completion indicating that the first command is processed, wherein the first completion is written in the first CQ, distributing the first completion of the first CQ to a virtualization layer, and writing the first completion thus distributed to a first virtual completion queue (VCQ) of the first virtual machine.

According to an embodiment, a storage virtualization device which communicates with a host device and a storage device set and supports a first virtual machine executable by the host device, includes a single root input/output virtualization (SR-IOV) adapter that communicates with the host device and provides a first interface with the first virtual machine, a first storage virtualization core that fetches a first command of a first virtual submission queue (VSQ) of the first virtual machine, an interposition layer that includes first mapping information between the first virtual machine and the storage device set, and a storage interface circuit that includes a first submission queue (SQ) and a first completion queue (CQ) and configured to communicate with the storage device set. The storage interface circuit provides the storage device set with the first command distributed to the first SQ from the first storage virtualization core through the interposition layer, receives, from the storage device set, a first completion indicating that the first command is processed, the first completion being written in the first CQ, and distributes the first completion of the first CQ to a virtualization layer through the interposition layer. The first storage virtualization core writes the first completion thus distributed to a first virtual completion queue (VCQ) of the first virtual machine.

According to an embodiment, an operation method of a storage system including a host device, a storage virtualization device, and a storage device set, the host device executing a virtual machine, the storage virtualization device supporting the virtual machine and including a submission queue (SQ) and a completion queue (CQ), and the storage device set communicating with the storage virtualization device. The method includes generating, by the host device, a doorbell indicating that a command is written in a virtual submission queue (VSQ) of the virtual machine, fetching, by the storage virtualization device, the command of the VSQ of the virtual machine, distributing, by the storage virtualization device, the fetched command to the SQ, providing, by the storage virtualization device, the command of the SQ to the storage device set, processing, by the storage device set and the host device, the command, writing, by the storage device set, a completion indicating that the command is processed, to the CQ, distributing, by the storage virtualization device, the completion of the CQ to a virtualization layer, and writing, by the storage virtualization device, the distributed completion to a virtual completion queue (VCQ) of the virtual machine.

BRIEF DESCRIPTION OF THE FIGURES

The above and other objects and features of the present disclosure will become apparent by describing in detail embodiments thereof with reference to the accompanying drawings.

FIG. 1 is a block diagram of a storage system, according to an embodiment of the present disclosure.

FIG. 2 is a block diagram of a storage system, according to some embodiments of the present disclosure.

DETAILED DESCRIPTION

Figure 3:
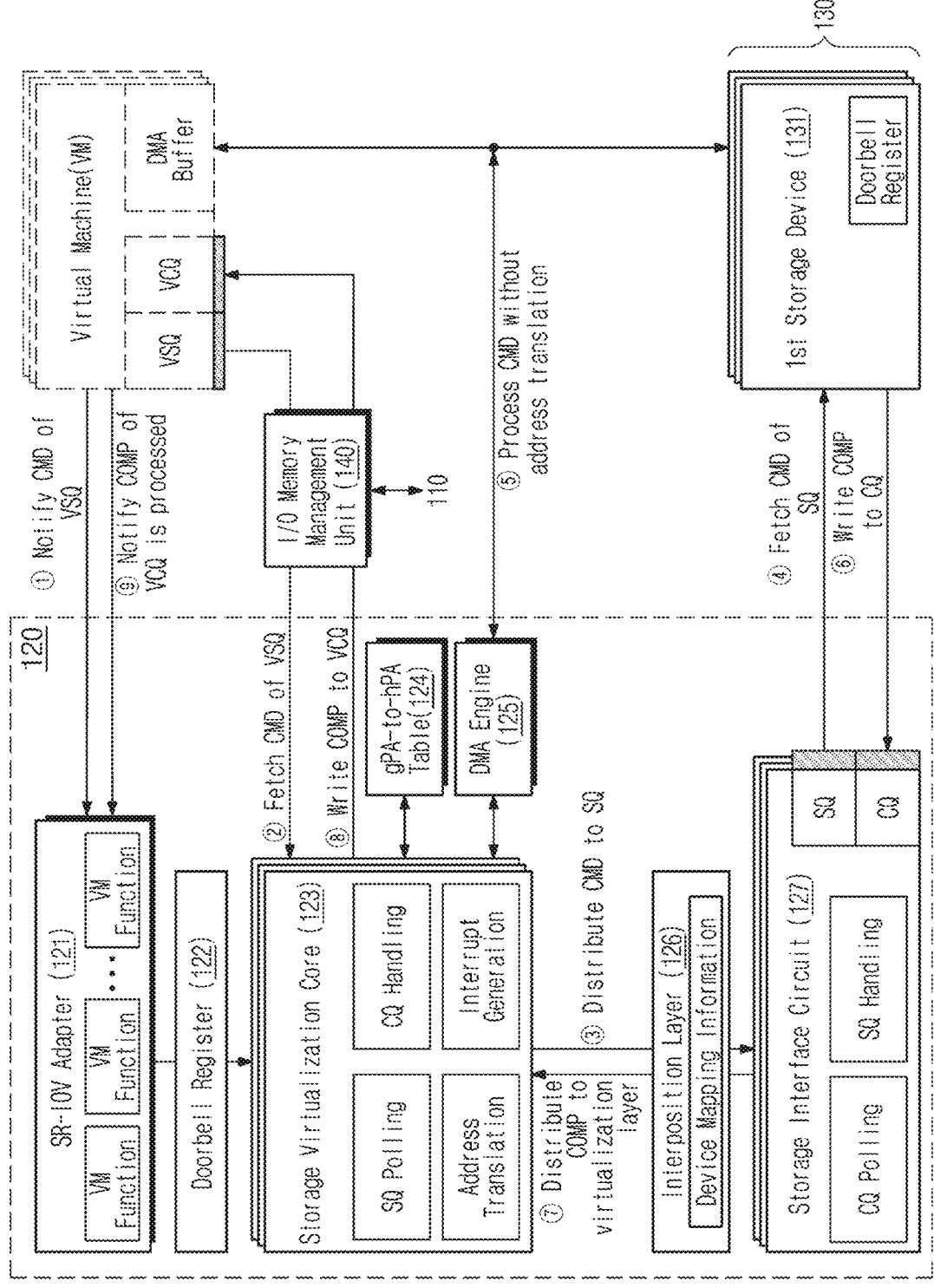
FIG. 3 is a diagram describing an operation method of a storage virtualization device, according to some embodiments of the present disclosure.

Below, embodiments of the present disclosure will be described in detail and clearly to such an extent that one skilled in the art easily carries out the present disclosure.

Components described in the detailed description with reference to terms "part", "unit", "module", "layer", etc. and function blocks illustrated in drawings may be implemented in the form of software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
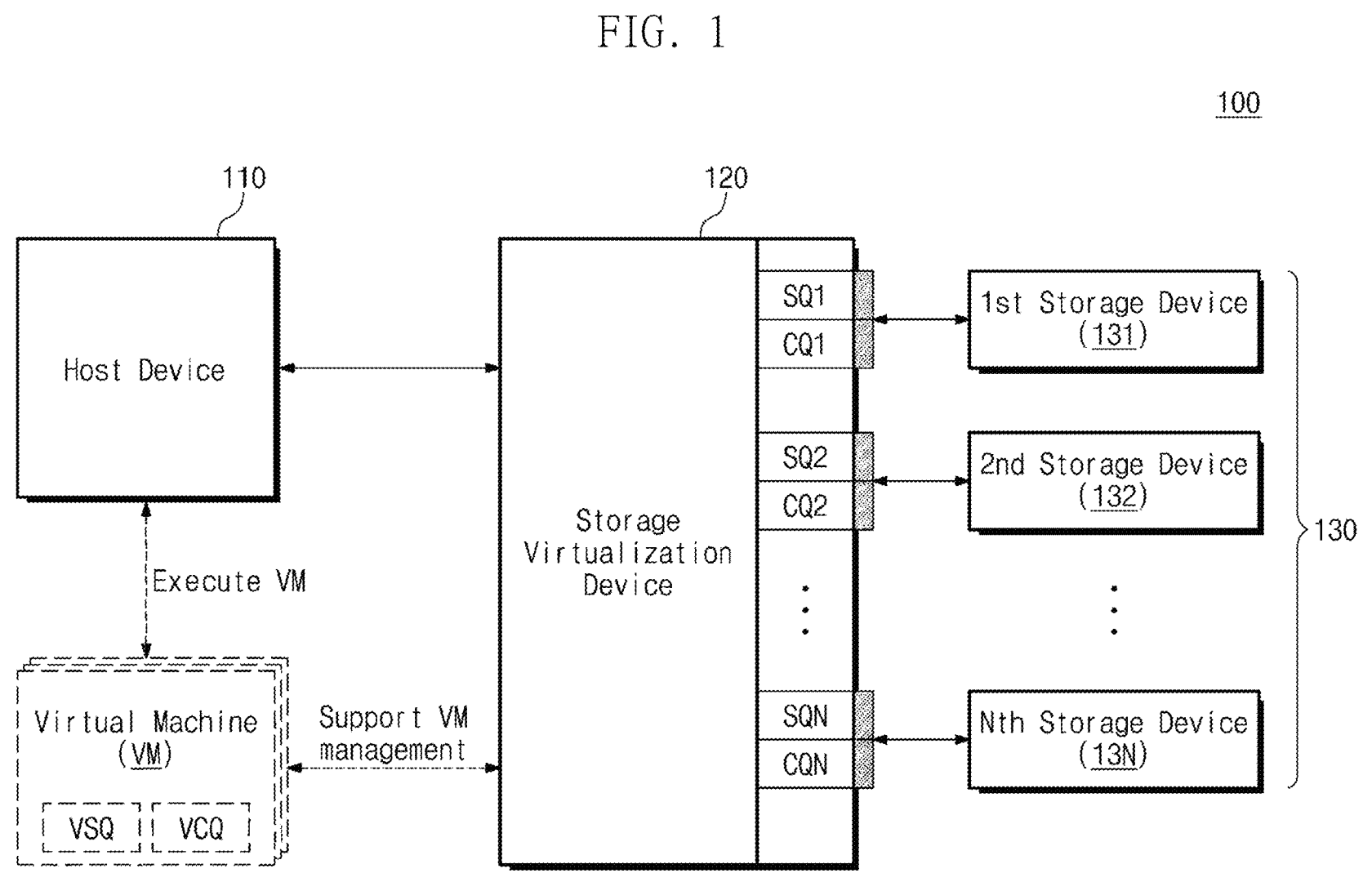

FIG. 1 is a block diagram of a storage system, according to an embodiment of the present disclosure. Referring to FIG. 1, a storage system 100 may include a host device 110, a storage virtualization device 120, and a storage device set 130. The storage system 100 may provide a plurality of virtual machines VM. A virtual machine VM may be a computing environment implemented by software, and an operating system or an application may be installed and executed on the virtual machine VM.

In some embodiments, the storage system 100 may be a server device. For example, the storage system 100 may be a server device that provides a cloud computing environment including the plurality of virtual machines VM for a plurality of users.

Because the plurality of virtual machines VM share a physical storage device (e.g., actual storage devices such as the storage device set 130), multiple virtual machines VM may be supported with a small number of storage devices. Also, a location and an operation of the virtual machine VM may not be limited to physical storage devices (e.g., the storage device set 130). For example, the virtual machine VM corresponding to a first storage device 131 may be changed to correspond to a second storage device 132.

The host device 110 may execute the virtual machine VM. For example, the host device 110 may actually perform computations for an operating system (OS) and an application executed on the virtual machine VM. The host device 110 may manage requests (e.g., a read command and a write command) for data processing of the virtual machine VM.

The storage virtualization device 120 may support the management of the virtual machine VM. The storage virtualization device 120 may communicate with the host device 110 and the storage device set 130. The storage virtualization device 120 may change a request from the virtual machine VM (e.g., a request received from the host device 110) so as to be processed by actual storage devices such as the storage device set 130. The storage virtualization device 120 may change a response received from the storage device set 130 so as to be processed by the virtual machine VM.

In some embodiments, the storage virtualization device 120 may be provided as a separate hardware device. For example, independently of the host device 110 and the storage device set 130, the storage virtualization device 120 may be installed on the storage system 100, may be removed from the storage system 100, may be replaced, or may operate.

In some embodiments, the storage virtualization device 120 may be implemented with a field programmable gate array (FPGA). However, the present disclosure is not limited thereto. For example, the storage virtualization device 120 may be implemented with various kinds of hardware devices communicating with the host device 110 and the storage device set 130, as well as the FPGA.

The storage device set 130 may include first to N-th storage devices 131 to 13N. Here, "N" is a natural number. Each of the first to N-th storage devices 131 to 13N may be a device that stores data. For example, the first storage device 131 may be a flash memory such as a solid state drive (SSD), but the present disclosure is not limited thereto. For example, the first storage device 131 may be an arbitrary storage medium that stores data depending on a write command and provides the stored data depending on a read command.

In some embodiments, the storage virtualization device 120 may include a submission queue (hereinafter referred to as "SQ") and a completion queue (hereinafter referred to as "CQ"). The SQ may be a buffer that stores a request for data processing of the virtual machine VM, such as a read command or a write command, and a physical address for the request. The CQ may be a buffer that stores a response (e.g., a completion indicating that data according to a request are processed) corresponding to the request of the SQ.

For example, the storage virtualization device 120 may include first to N-th SQs SQ1 to SQN and first to N-th CQs CQ1 to CQN. The first SQ SQ1 and the first CQ CQ1 may correspond to the first storage device 131. The second SQ SQ2 and the second CQ CQ2 may correspond to the second storage device 132. The N-th SQ SQN and the N-th CQ CQN may correspond to the N-th storage device 13N. For brevity of drawing, a storage device is illustrated as corresponding to a pair of SQ and CQ, but the present disclosure is not limited thereto. For example, the storage device may correspond to multiple SQ and CQ pairs, which will be described with reference to FIGS. 6A, 6B, 6C, 7A, 7B, and 7C.

In some embodiments, the storage virtualization device 120 may provide mapping between the virtual machine VM and the storage device. For example, the virtual machine VM may include a virtual submission queue (hereinafter referred to as "VSQ") and a virtual completion queue (hereinafter referred to as "VCQ"). The VSQ may be a buffer that stores a request for data processing of the virtual machine VM and a virtual address for the request. The VCQ may be a buffer that stores a response (e.g., a completion indicating that data according to a request are processed) corresponding to the request of the VSQ. The VSQ and the VCQ may be physically stored in a memory of the host device 110. In the case where the virtual machine VM corresponds to the first storage device 131, the storage virtualization device 120 may provide mapping between the first SQ SQ1 and the first VSQ and mapping between the first CQ CQ1 and the VCQ.

As described above, according to the present disclosure, the storage system 100 including the storage virtualization device 120 supporting the management of the virtual machine VM is provided. As the storage virtualization device 120 is implemented with separate hardware, not software executable by the host device 110, resources of the host device 110 may be saved, and a data rate may be improved. Also, as the storage virtualization device 120 provides mapping between the virtual machine VM and the storage device set 130, a flexible resource management function and a flexible virtual machine management function may be provided.

Figure 2:
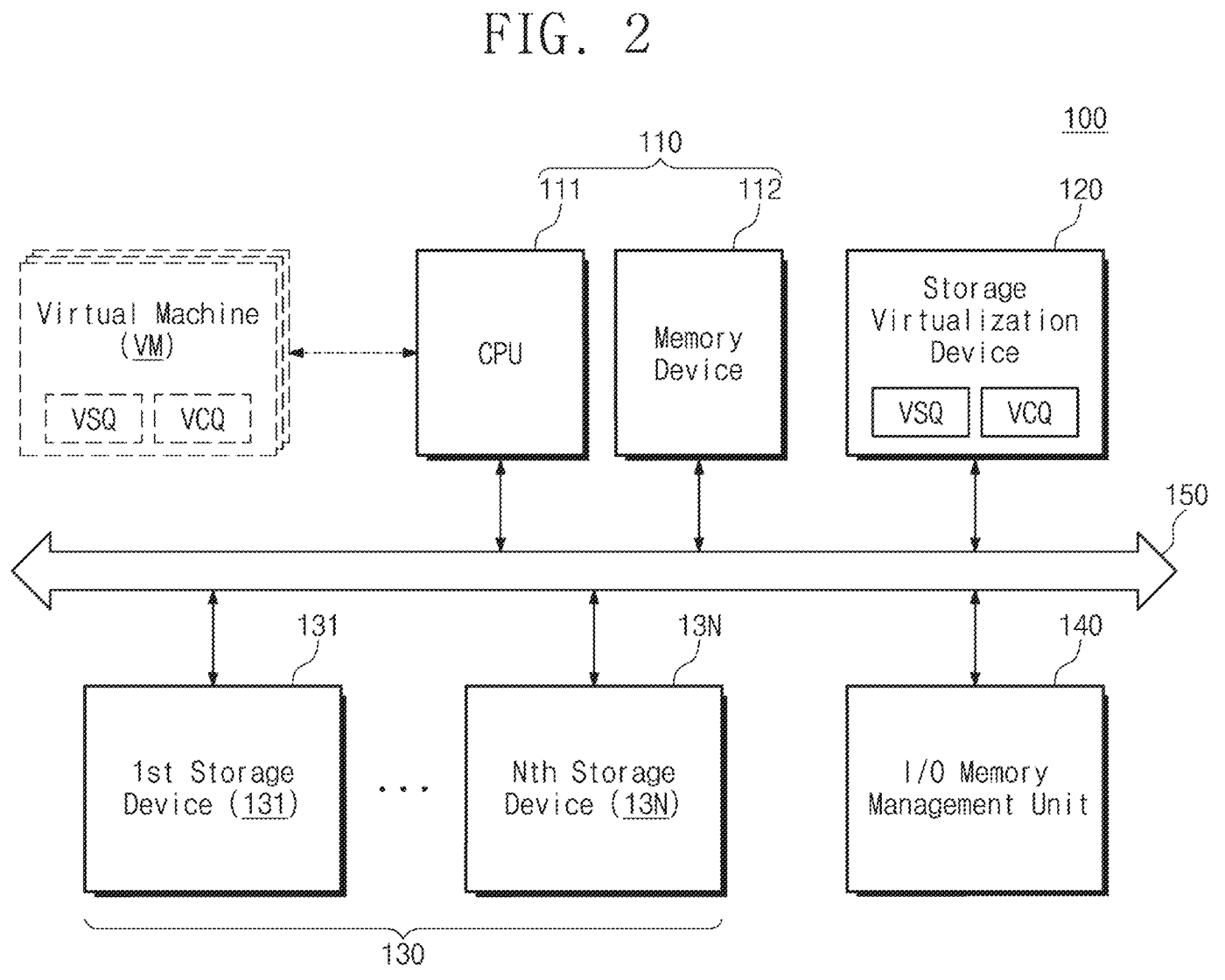

FIG. 2 is a block diagram of a storage system, according to some embodiments of the present disclosure. Referring to FIG. 2, the storage system 100 may include the host device 110, the storage virtualization device 120, the storage device set 130, an input/output (I/O) memory management unit 140, and a communication interface 150. The storage system 100 may provide the plurality of virtual machines VM.

The virtual machine VM may include a VSQ and a VCQ. In some embodiments, the VSQ and the VCQ may correspond to an SQ and a CQ of the storage virtualization device 120, respectively.

The host device 110 may include a central processing unit (CPU) 111 and a memory device 112. The CPU 111 may execute the virtual machine VM. For example, the CPU 111 may actually perform computations for an operating system (OS) and an application executed on the virtual machine VM. The CPU 111 may manage requests for data processing of the virtual machine VM. The CPU 111 may write a command to the VSQ of the virtual machine VM. The CPU 111 may read a completion written in the VCQ of the virtual machine VM.

The memory device 112 may store data for implementing the virtual machine VM. For example, the memory device 112 may store data such as the operating system (OS) and the application executable on the virtual machine VM. The memory device 112 may provide physical storage spaces corresponding to the VSQ and the VCQ of the virtual machine VM.

The storage virtualization device 120 may include the SQ and the CQ. The storage virtualization device 120 may provide mapping between the plurality of virtual machines VM and the storage device set 130. For example, the storage virtualization device 120 may change a command written in the VSQ of the virtual machine VM so as to be processed at the storage device set 130, and may store the changed command in the SQ. The storage virtualization device 120 may change a completion written in the CQ by the storage device set 130 so as to be processed by the virtual machine VM, and may write the changed completion to the VCQ of the virtual machine VM.

The storage device set 130 may include the first to N-th storage devices 131 to 13N. Depending on a request (e.g., a read command or a write command) of the virtual machine VM, each of the first to N-th storage devices 131 to 13N may store data or may provide the stored data. For brevity of drawing, the storage virtualization device 120 is illustrated as including a pair of SQ and CQ, but the storage virtualization device 120 may provide SQ and CQ pairs respectively corresponding to the first to N-th storage devices 131 to 13N.

The I/O memory management unit 140 may manage translation between a virtual address of the virtual machine VM and a physical address of the memory device 112 in the host device 110. For example, the virtual machine VM may be software executed by the CPU 111, and a virtual address for data on the virtual machine VM may correspond to a physical address for actual data of the memory device 112. The I/O memory management unit 140 may translate a virtual address into a corresponding physical address or may translate a physical address into a corresponding virtual address.

When a command is written in the VSQ of the virtual machine VM, it may be difficult for the storage virtualization device 120 to directly read the command written in the VSQ of the virtual machine VM. When a request for a command of the VSQ (e.g., a request for fetching a command of the VSQ) is received from the storage virtualization device 120, the I/O memory management unit 140 may translate a virtual address of the virtual machine VM into a physical address of the memory device 112. The I/O memory management unit 140 may provide a request including the translated physical address to the host device 110. The storage virtualization device 120 may receive actual data of the memory device 112, and the actual data may be the same as the command written in the VSQ of the virtual machine VM.

In some embodiments, the I/O memory management unit 140 may be omitted. In the case where the I/O memory management unit 140 is omitted, the storage virtualization device 120 may manage mapping information between a virtual address of the virtual machine VM and a physical address of the memory device 112.

The communication interface 150 may provide an interface for communication between the host device 110, the storage virtualization device 120, the storage device set 130, and the I/O memory management unit 140. In some embodiments, the communication interface 150 may be implemented with a peripheral component interconnect express (PCIe) interface. For example, the communication interface 150 may include a PCIe switch (not illustrated). The PCIe switch may support communication between the storage virtualization device 120 and the storage device set 130 without intervention of the host device 110.

FIG. 3 is a diagram describing an operation method of a storage virtualization device, according to some embodiments of the present disclosure. Referring to FIG. 3, the storage virtualization device 120 may communicate with the virtual machine VM, the storage device set 130, and the I/O memory management unit 140. That the storage virtualization device 120 communicates with the virtual machine VM may indicate that the storage virtualization device 120 physically communicates with the host device 110 executing the virtual machine VM.

The storage virtualization device 120 may include a single root input/output virtualization (SR-IOV) adapter 121, a doorbell register 122, a storage virtualization core 123, a guest physical address to host physical address (gPA-to-hPA) table 124, a direct memory access (DMA) engine 125, an interposition layer 126, and a storage interface circuit 127.

The SR-IOV adapter 121 may communicate with the host device 110 executing the virtual machine VM and may provide an interface with the virtual machine VM. The SR-IOV adapter 121 may include a plurality of virtual functions (hereinafter referred to as "VFs"). The plurality of VFs may correspond to the plurality of virtual machines VM. Each of the plurality of VFs may provide an interface with the corresponding virtual machine VM. The VF may allow the virtual machine VM to access the storage device set 130 without passing through a software layer. Each of the plurality of VFs in the SR-IOV adapter 121 may operate like an independent storage device. The SR-IOV adapter 121 may allow the plurality of virtual machines VM to share one physical device (e.g., the first storage device 131).

The doorbell register 122 may communicate with the SR-IOV adapter 121 and the storage virtualization core 123. The doorbell register 122 may receive, through the SR-IOV adapter 121, a doorbell from the host device 110 executing the virtual machine VM. The doorbell may refer to a signal indicating that a command is written in the VSQ of the virtual machine VM. Through the SQ polling of the storage virtualization core 123, the doorbell register 122 may notify the storage virtualization core 123 that a command is written in the VSQ of the virtual machine VM.

The storage virtualization core 123 may communicate with the doorbell register 122, the gPA-to-hPA table 124, the DMA engine 125, the interposition layer 126, and the I/O memory management unit 140.

In some embodiments, the storage virtualization device 120 may include a plurality of storage virtualization cores 123. For example, the plurality of storage virtualization cores 123 may correspond to the plurality of virtual machines VM, respectively. One storage virtualization core 123 may correspond to one virtual machine VM.

However, the present disclosure is not limited thereto. Modification may be made by one skilled in the art such that one storage virtualization core 123 corresponds to a plurality of virtual machines VM or such that a plurality of storage virtualization cores 123 correspond to one virtual machine VM.

The storage virtualization core 123 may perform SQ polling, CQ handling, address translation, and interrupt generation. The SQ polling may indicate an operation of periodically checking whether a doorbell is stored in the doorbell register 122. The CQ handling may indicate an operation of distributing and managing a completion written in the CQ of the storage interface circuit 127 to a virtualization layer. The address translation may indicate translation between a virtual address of the virtual machine VM and a physical address of the host device 110 executing the virtual machine VM with reference to the gPA-to-hPA table 124. The interrupt generation may indicate generating an interrupt to be provided to the host device 110 executing the virtual machine VM. The interrupt may refer to a signal requesting processing of a completion written in the VCQ of the virtual machine VM.

In some embodiments, the storage virtualization core 123 may process a doorbell stored in the doorbell register 122. For example, the storage virtualization core 123 may check that a doorbell is stored in the doorbell register 122, may fetch a command of the VSQ of the virtual machine VM through the I/O memory management unit 140, and may provide the fetched command to the interposition layer 126.

In some embodiments, the storage virtualization core 123 may write a completion to the VCQ of the virtual machine VM. For example, the storage virtualization core 123 may receive a completion from the storage interface circuit 127 through the interposition layer 126 and may write the completion to the VCQ of the virtual machine VM through the I/O memory management unit 140.

The gPA-to-hPA table 124 may manage mapping between a guest physical address and a host physical address. The guest physical address may mean a virtual address of the virtual machine VM. The host physical address may mean a physical address of the host device 110 executing the virtual machine VM. Both the guest physical address and the host physical address may correspond to an address of a DMA buffer of the virtual machine VM. Mapping information of the gPA-to-hPA table 124 may be used for address translation of the storage virtualization core 123.

DMA engine 125 may support a DMA operation between the virtual machine VM and the storage device set 130. The DMA operation may refer to processing a command written in the VSQ. The DMA operation may be performed without address translation. To prevent a drawing from being complicated, even though explicitly expressed in FIG. 3, the DMA engine 125 may assist fetching a command of the VSQ of the virtual machine VM and writing a completion to the VCQ of the virtual machine VM.

The interposition layer 126 may communicate with the storage virtualization core 123 and the storage interface circuit 127. The interposition layer 126 may include device mapping information. The device mapping information may include a correspondence relationship between the plurality of virtual machines VM and the storage device set 130.

In some embodiments, the VSQ and the VCQ for the virtual machine VM may have a correspondence relationship with an SQ and a CQ for a storage device. For example, the device mapping information may include information indicating that the VSQ and the VCQ of the virtual machine VM correspond to the SQ and the CQ for the first storage device 131, respectively.

In some embodiments, the interposition layer 126 may manage mapping between the VSQ and the SQ. For example, the storage virtualization device 123 may fetch a command of the VSQ of the virtual machine VM. The interposition layer 126 may receive the fetched command from the storage virtualization core 123. The interposition layer 126 may distribute the received command to the SQ of the storage interface circuit 127.

In some embodiments, the interposition layer 126 may manage mapping between the VCQ and the CQ. For example, a completion may be written in the CQ of the storage interface circuit 127. The interposition layer 126 may distribute the completion written in the CQ of the storage interface circuit 127 to a virtualization layer. The interposition layer 126 may provide the completion distributed to the virtualization layer to the storage virtualization core 123.

The storage interface circuit 127 may communicate with the interposition layer 126 and the storage device set 130.

In some embodiments, the storage virtualization device 120 may include a plurality of storage interface circuits 127. For example, the plurality of storage interface circuits 127 may respectively correspond to a plurality of storage devices included in the storage device set 130. The first storage device 131 may correspond to the storage interface circuit 127.

However, the present disclosure is not limited thereto. Modification may be made by one skilled in the art such that one storage interface circuit 127 corresponds to a plurality of storage devices or such that the first storage device 131 corresponds to the plurality of storage interface circuits 127. However, the interposition layer 126 may manage mapping information such that a pair of SQ and CQ corresponds to a pair of VSQ and VCQ.

The storage interface circuit 127 may include the SQ and the CQ. The storage interface circuit 127 may include CQ polling and SQ handling. The CQ polling may indicate an operation of periodically checking whether a completion is written in the CQ of the storage interface circuit 127. The SQ handling may indicate an operation of managing a command distributed to the SQ through the interposition layer 126.

In some embodiments, the storage interface circuit 127 may provide the storage device set 130 with the command stored in the SQ. For example, the storage interface circuit 127 may output, to the first storage device 131, a doorbell providing notification that a command is written in the SQ. The first storage device 131 may fetch the command written in the SQ, based on the doorbell stored in a doorbell register.

In some embodiments, the storage interface circuit 127 may receive a completion from the storage device set 130. For example, the first storage device 131 may fetch a command of the SQ. The first storage device 131 may process the fetched command. The first storage device 131 may write a completion, which indicates that the command is processed, to the CQ of the storage interface circuit 127.

The storage virtualization device 120 may communicate with the plurality of virtual machines VM. The virtual machine VM may include the VSQ, the VCQ, and the DMA buffer. The VSQ may store a command to be processed at the storage device set 130. The virtual machine VM may notify the storage virtualization device 120 that a command is written in the VSQ, and the storage virtualization device 120 may fetch the command of the VSQ through the I/O memory management unit 140.

The VCQ may store a completion indicating that the command of the VSQ is processed. When a completion is written in the CQ of the storage interface circuit 127, the storage virtualization device 120 may write a completion to the VCQ of the virtual machine VM through the I/O memory management unit 140. The virtual machine VM may check that the completion is written in the VCQ and may process the completion. The virtual machine VM may notify the storage virtualization device 120 that the completion of the VCQ is processed. The storage virtualization device 120 may notify the storage device set 130 that the completion is processed.

The DMA buffer may communicate with the storage device set 130. The DMA buffer may exchange data with the storage device set 130 through a DMA operation (e.g., a DMA read operation or a DMA write operation). The data exchange between the DMA buffer and the storage device set 130 through the DMA operation may mean processing a command written in the SQ. The DMA engine 125 of the storage virtualization device 120 may assist the DMA operation of the DMA buffer. For example, the DMA engine 125 may assist or manage a data transfer between a host memory, on which the virtual machine VM including the DMA buffer is executed, and the first storage device 131 of the storage device set 130.

In this case, because the storage virtualization device 120 changes a virtual address (e.g., a guest physical address) of the virtual machine VM to a physical address (e.g., a host physical address) of the host device 110 with reference to the gPA-to-hPA table 124 and provides the physical address thus changed to the storage device set 130, the DMA operation between the DMA buffer of the virtual machine VM and the storage device set 130 may be performed without address translation by the I/O memory management unit 140.

The storage device set 130 may include a plurality of storage devices. Each of the plurality of storage devices may include a doorbell register. For example, the storage device set 130 may include the first storage device 131. The first storage device 131 may correspond to a pair of SQ and CQ of the storage interface circuit 127. The first storage device 131 may include the doorbell register. The doorbell register may store a doorbell indicating that a command is written in the SQ of the storage interface circuit 127. The first storage device 131 may fetch the command written in the SQ of the storage interface circuit 127, based on the doorbell stored to the doorbell register. The first storage device 131 may communicate with the virtual machine VM to process the command (e.g., to perform the DMA operation).

The I/O memory management unit 140 may manage an input and an output of the host device 110 executing the virtual machine VM. The I/O memory management unit 140 may assist communication between the storage virtualization device 120 and the virtual machine VM by performing address translation between a virtual address and a physical address.

For example, when there is a request of the storage virtualization device 120 for the purpose of fetching a command of the VSQ, with regard to the request, a virtual address corresponding to the VSQ may be translated into a physical address of the host device 110. The storage virtualization device 120 may fetch the command of the VSQ by reading data at the translated physical address.

For example, when there is a request of the storage virtualization device 120 for the purpose of writing a completion to the VCQ, with regard to the request, a virtual address corresponding to the VCQ may be translated into a physical address of the host device 110. The storage virtualization device 120 may write the completion to the VCQ by writing data at the translated physical address.

In some embodiments, the I/O memory management unit 140 may be selectively used. In the case where address translation between a virtual address and a physical address is performed by the storage virtualization core 123, the I/O memory management unit 140 may be omitted.

The structures and functions of the virtual machine VM, the host device 110 executing the virtual machine VM, the storage virtualization device 120, the storage device set 130, and the I/O memory management unit 140 are described above with reference to FIG. 3.

According to some embodiments of the present disclosure, the storage virtualization device 120 may perform a series of operations to support communication between the virtual machine VM and the storage device set 130. For example, an operation method of the storage virtualization device 120 may include first to ninth operations ① to ⑨.

In the first operation ①, the virtual machine VM may provide notification that a command is written in the VSQ. For example, the plurality of virtual machines VM may respectively correspond to the plurality of VFs (e.g., modules providing an interface with the virtual machine VM) of the SR-IOV adapter 121. Through the interface that the VF provides, the virtual machine VM may output a doorbell indicating that the command is written in the VSQ. The SR-IOV adapter 121 may send the doorbell received from the virtual machine VM to the doorbell register 122.

In the second operation ②, the storage virtualization device 120 may check that the command is written in the VSQ and may fetch the command of the VSQ. For example, the storage virtualization core 123 may perform the SQ polling with respect to the doorbell register 122 and thus may check that the doorbell is stored. The storage virtualization core 123 may request the command of the VSQ and may receive the command of the VSQ as a response to the request.

In some embodiments, the storage virtualization core 123 may request the command of the VSQ through the I/O memory management unit 140. For example, to fetch the command of the VSQ may mean to read actual data from the host device 110. The I/O memory management unit 140 may translate a virtual address corresponding to the VSQ of the virtual machine VM into a physical address of the host device 110. The storage virtualization core 123 may fetch the command of the VSQ, based on the translated physical address.

In the third operation ③, the storage virtualization device 120 may distribute the command of the VSQ thus fetched to the SQ of the storage interface circuit 127. For example, the storage virtualization core 123 may translate the virtual address of the DMA buffer included in the fetched command into the physical address of the host device 110 and may send a command including the translated physical address to the SQ of the storage interface circuit 127.

In the fourth operation ④, the storage virtualization device 120 may provide the command of the SQ to the storage device set 130. For example, the storage interface circuit 127 may output a doorbell, which indicates that the command is written in the SQ, to the doorbell register of the first storage device 131. The first storage device 131 may output a request for fetching the command of the SQ to the storage interface circuit 127. The storage interface circuit 127 may output, as a response to the request, the command of the SQ to the first storage device 131.

In the fifth operation ⑤, the storage device set 130 may process the fetched command. For example, in the case where the first storage device 131 fetches a command, the first storage device 131 may communicate with the DMA buffer of the virtual machine VM to process the command. In this case, because the virtual address is already translated into the physical address by the storage virtualization core 123, the first storage device 131 may communicate with the DMA buffer of the virtual machine VM without address translation by the I/O memory management unit 140 and thus may process the command. The DMA engine 125 of the storage virtualization device 120 may assist the command processing of the first storage device 131.

In the sixth operation ⑥, the storage device set 130 may write a completion, which indicates that the command is processed, to the CQ of the storage interface circuit 127. For example, after the first storage device 131 completely processes the command through the communication with the DMA buffer of the virtual machine VM, the first storage device 131 may write the completion to the CQ of the storage interface circuit 127.

In the seventh operation ⑦, the storage interface circuit 127 may distribute the completion of the CQ to the virtualization layer through the interposition layer 126. The CQ of the storage interface circuit 127 may be mapped onto the VCQ of the virtual machine VM.

In the eighth operation ⑧, the storage virtualization core 123 may write the completion distributed to the virtualization layer to the VCQ of the virtual machine VM. In some embodiments, the storage virtualization core 123 may write the completion to the VCQ of the virtual machine VM through the I/O memory management unit 140. For example, to write the completion to the VCQ of the virtual machine VM may mean to store actual data to the host device 110. The I/O memory management unit 140 may translate a virtual address corresponding to the VCQ of the virtual machine VM into a physical address of the host device 110. The storage virtualization core 123 may write the completion to the VCQ, based on the translated physical address.

In the ninth operation ⑨, the virtual machine VM may process the completion written in the VCQ and may notify the storage virtualization device 120 that the completion is processed. The storage virtualization device 120 may notify the storage device set 130 that the completion is processed and may release the CQ.

Figure 4:
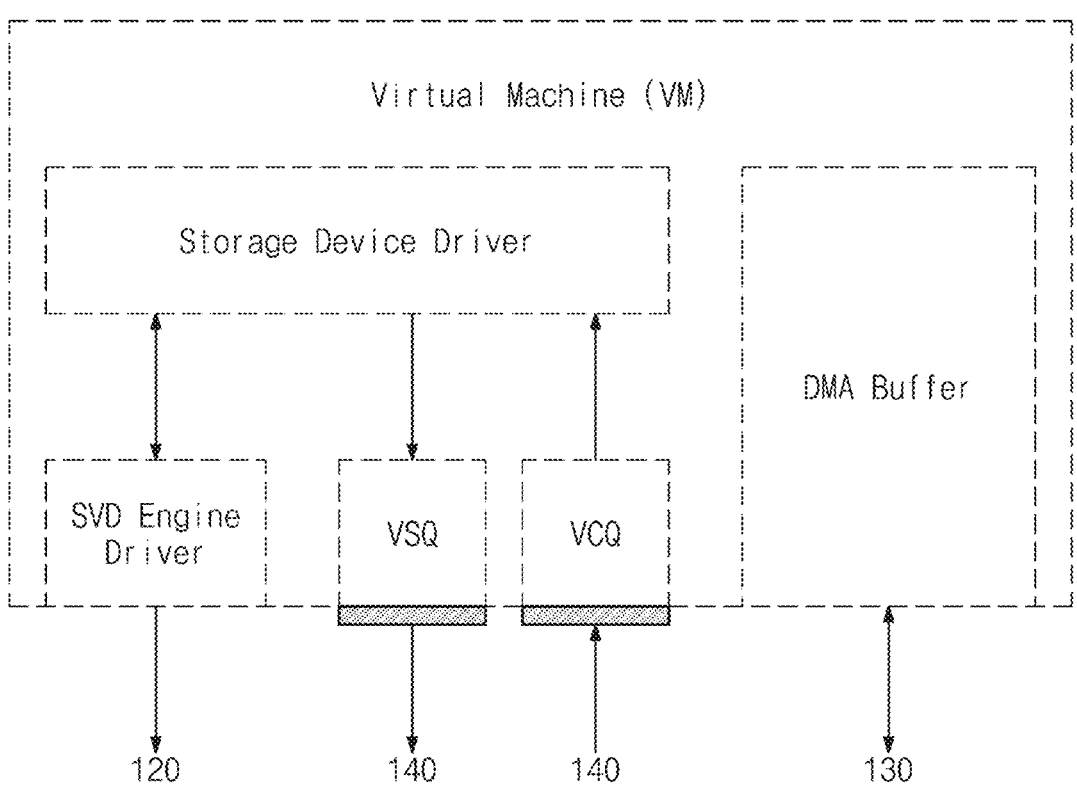
FIG. 4 is a block diagram of a virtual machine, according to some embodiments of the present disclosure.

FIG. 4 is a block diagram of a virtual machine, according to some embodiments of the present disclosure. Referring to FIG. 4, the virtual machine VM is illustrated. The virtual machine VM may correspond to each of the plurality of virtual machines VM described with reference to FIGS. 1 to 3. The virtual machine VM may communicate with the storage virtualization device 120, the storage device set 130, and the I/O memory management unit 140.

The virtual machine VM may include a storage device driver, a storage virtualization device (SVD) engine driver, the VSQ, the VCQ, and the DMA buffer. Characteristics of the VSQ, the VCQ, and the DMA buffer are similar to characteristics of the VSQ, the VCQ, and the DMA buffer described with reference to FIG. 3, and thus, additional description will be omitted to avoid redundancy.

The storage device driver may communicate with the SVD engine driver, the VSQ, and the VCQ. The storage device driver may write a command to the VSQ. The command written in the VSQ may be provided to the storage virtualization device 120 through the I/O memory management unit 140. The storage device driver may process a completion written in the VCQ. The completion of the VCQ may be written by the storage virtualization device 120 through the I/O memory management unit 140.

The SVD engine driver may communicate with the storage device driver and the storage virtualization device 120. The SVD engine driver may intercept a command that the storage device driver provides to the VSQ and may output, to the storage virtualization device 120, a doorbell indicating that the command is written in the VSQ. The SVD engine driver may intercept a completion that the storage device driver provides to the VCQ and may output, to the storage virtualization device 120, a doorbell indicating that the completion is written in the VCQ.

Figure 5:
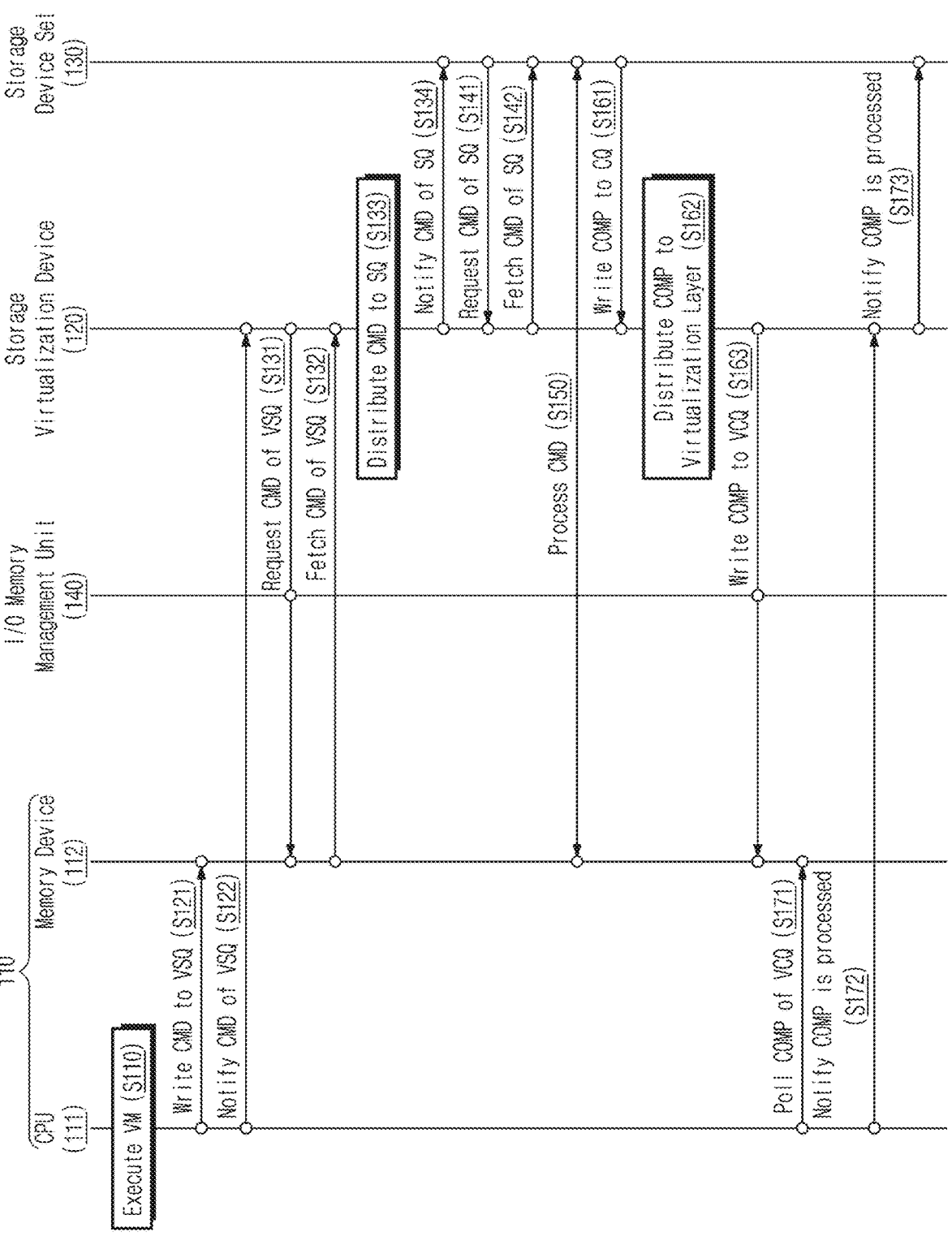
FIG. 5 is a flowchart describing an operation method of a storage system, according to some embodiments of the present disclosure.

FIG. 5 is a flowchart describing an operation method of a storage system, according to some embodiments of the present disclosure. An operation method of a storage system will be described with reference to FIG. 5. The storage system may correspond to the storage system 100 of FIGS. 1 and 2. The storage system may include the host device 110, the storage virtualization device 120, the storage device set 130, and the I/O memory management unit 140. The host device 110 may include the CPU 111 and the memory device 112.

In operation S110, the CPU 111 may execute the virtual machine VM. The virtual machine VM, an operating system executable on the virtual machine VM, an application, and the like may be stored to the memory device 112. For example, the VSQ and the VCQ of the virtual machine VM may be physically implemented at the memory device 112 of the host device 110.

In operation S121, the CPU 111 may write a command to the VSQ of the memory device 112. For example, the command may be a command for data processing of the virtual machine VM, such as a read command or a write command.

In operation S122, the CPU 111 may notify the command of the VSQ to the storage virtualization device 120. For example, the CPU 111 may output, to the storage virtualization device 120, a doorbell indicating that the command is written in the VSQ of the virtual machine VM.

In operation S131, the storage virtualization device 120 may request the command of the VSQ. To read the command of the VSQ of the virtual machine VM may mean to read data of the memory device 112 physically. The I/O memory management unit 140 may translate a virtual address corresponding to the VSQ into a physical address corresponding to the memory device 112. The storage virtualization device 120 may request the command of the VSQ by accessing the memory device 112 based on the translated physical address.

In operation S132, the storage virtualization device 120 may fetch the command of the VSQ, based on the access to the memory device 112. To fetch the command of the VSQ may mean to receive a response corresponding to the request in operation S131 from the memory device 112. In some embodiments, operation S132 may be performed without intervention of the I/O memory management unit 140. For example, the response in operation S132 may only include data associated with the request in operation S131 and may not include an address of the virtual machine VM. The storage virtualization device 120 may receive the command of the VSQ from the memory device 112 without address translation by the I/O memory management unit 140.

In operation S133, the storage virtualization device 120 may distribute the command to the SQ. The SQ may be mapped onto the VSQ of the virtual machine VM. The storage virtualization device 120 may manage mapping between the SQ and the VSQ.

In some embodiments, operation S133 may include translating a virtual address (e.g., an address included in the fetched command) of the DMA buffer of the virtual machine VM into a physical address of the memory device 112.

In operation S134, the storage virtualization device 120 may notify the storage device set 130 that the command is written in the SQ. For example, the storage virtualization device 120 may output, to the storage device set 130, a doorbell indicating that the command is written in the SQ.

In operation S141, the storage device set 130 may request the command of the SQ. In operation S142, the storage device set 130 may fetch the command of the SQ. To fetch the command of the SQ may mean to receive a response corresponding to the request in operation S141.

In operation S150, the storage device set 130 may process the command. For example, the command may be a DMA read operation or a DMA write operation. The storage device set 130 may communicate with the memory device 112 to process the command. In this case, as described above, because the virtual address of the virtual machine VM is translated into the physical address of the memory device 112 through the distribution in operation S133, the communication between the storage device set 130 and the memory device 112 may be performed without address translation by the I/O memory management unit 140.

In operation S161, the storage device set 130 may write a completion to the CQ of the storage virtualization device 120. The completion may indicate that the command is processed (i.e., that operation S150 is completed).

In operation S162, the storage virtualization device 120 may distribute the completion of the CQ to the virtualization layer. The CQ may be mapped onto the VCQ of the virtual machine VM. The storage virtualization device 120 may manage mapping between the CQ and the VCQ.

In operation S163, the storage virtualization device 120 may write a completion to the VCQ of the virtual machine VM. To write the completion to the VCQ of the virtual machine VM may mean to write data to the memory device 112 physically. The I/O memory management unit 140 may translate a virtual address corresponding to the VCQ into a physical address corresponding to the memory device 112. The storage virtualization device 120 may write the completion to the VCQ by accessing the memory device 112 based on the translated physical address.

In operation S171, the CPU 111 may poll the VCQ of the memory device 112. For example, the CPU 111 may periodically check whether a completion is written in the VCQ of the memory device 112. The CPU 111 may determine that a completion is written in the VCQ of the virtual machine VM, through the polling. In the case where the polling is not performed by the CPU 111, the storage virtualization device 120 may output an interrupt to the CPU 111 for the purpose of notifying the CPU 111 that a completion is written in the VCQ. The CPU 111 may process the completion written in the VCQ.

In operation S172, the CPU 111 may notify the storage virtualization device 120 that the completion of the VCQ is processed. Afterwards, in operation S173, the storage virtualization device 120 may release the CQ and may notify the storage device set 130 that the command is processed.

Figure 6A:
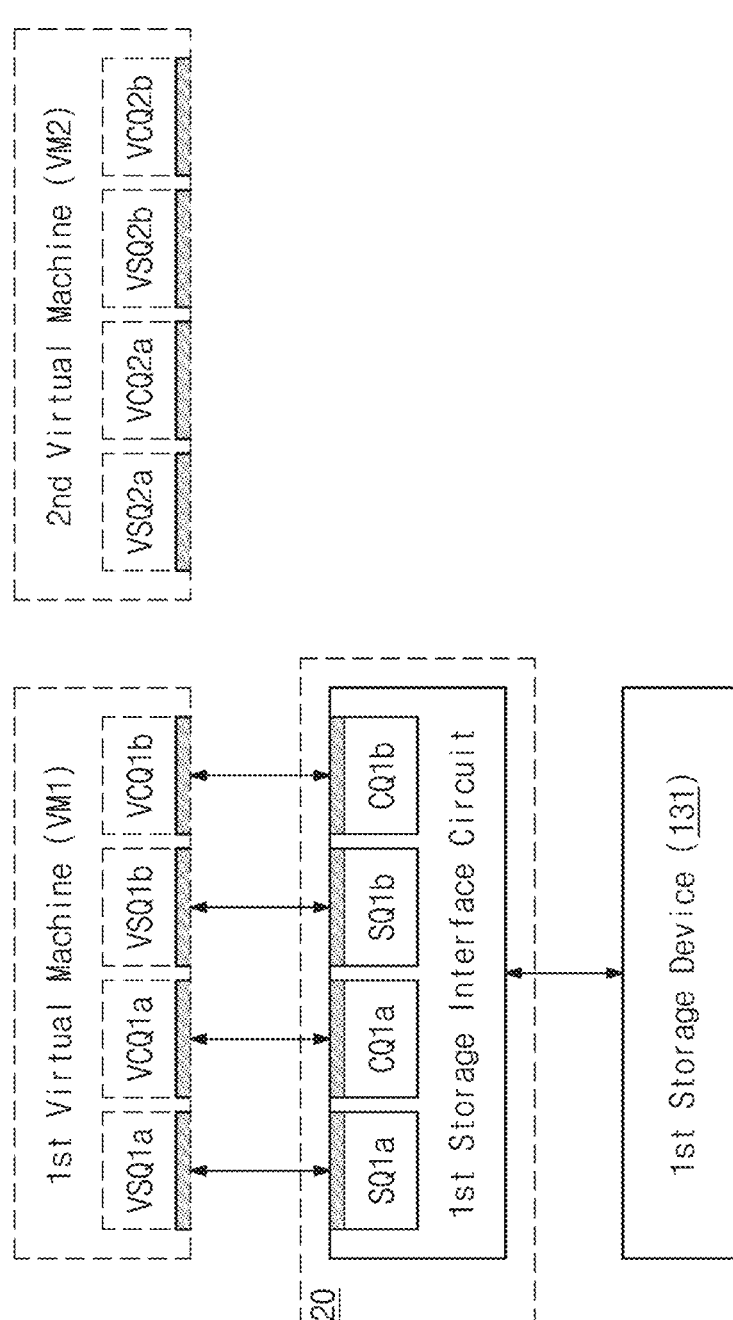
FIGS. 6A, 6B, and 6C are diagrams for describing resource allocations of a plurality of virtual machines, according to some embodiments of the present disclosure.
Figure 6B:
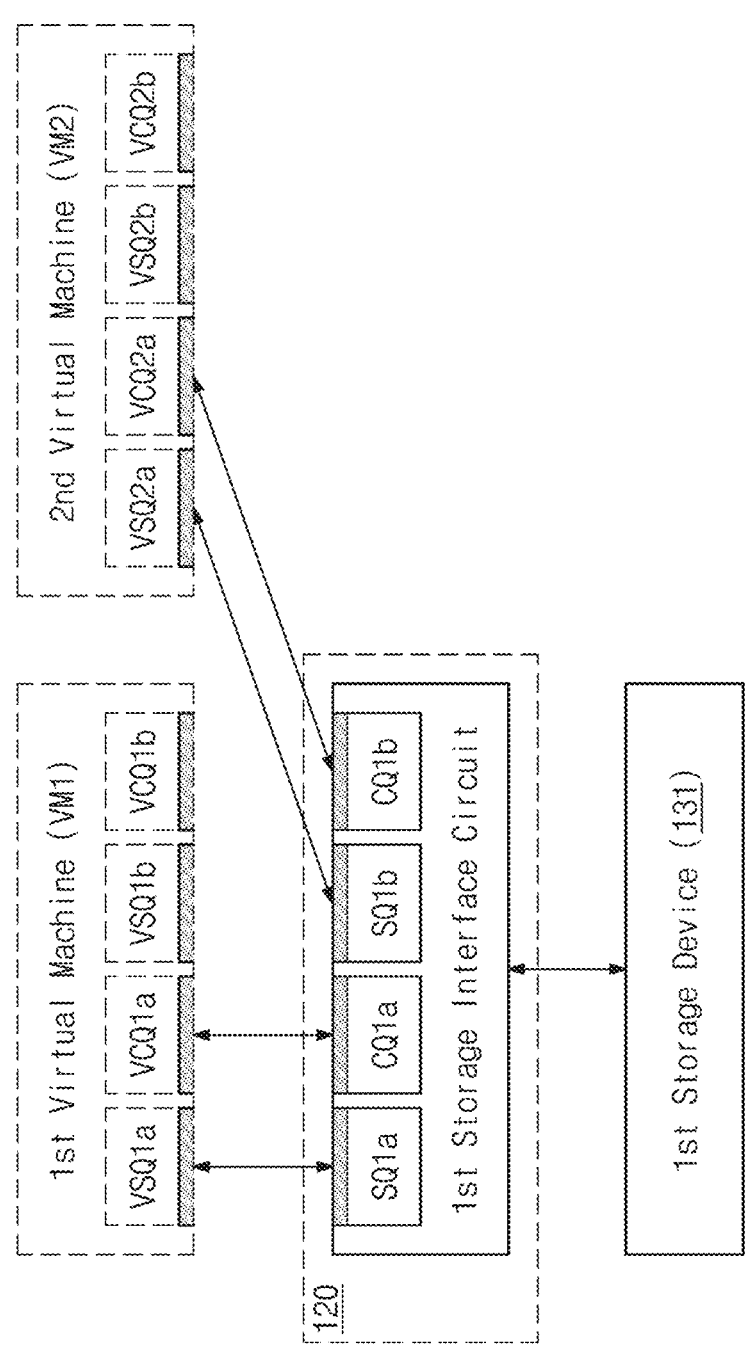
Figure 6C:
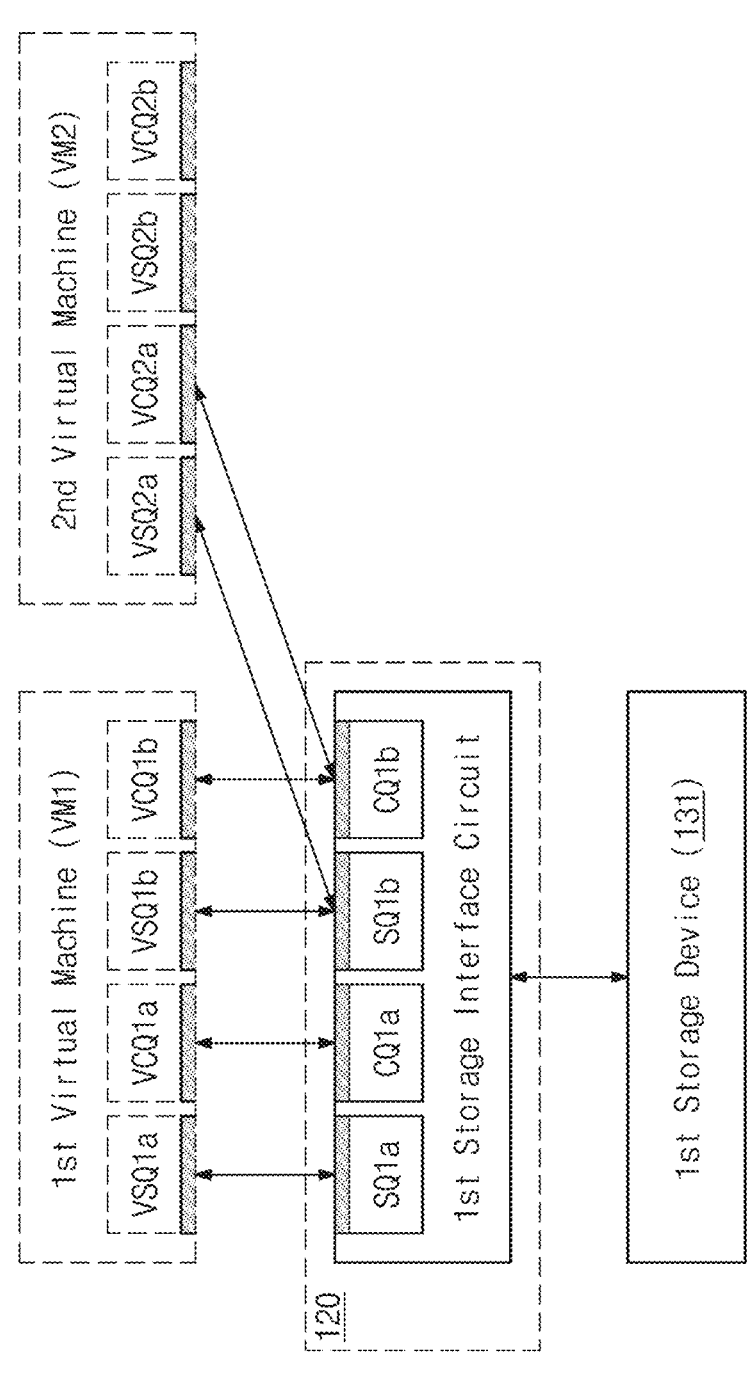

FIGS. 6A, 6B, and 6C are diagrams for describing resource allocations of a plurality of virtual machines, according to some embodiments of the present disclosure. Referring to FIGS. 6A, 6B, and 6C, a first virtual machine VM1 may include queues VSQ1a, VCQ1a, VSQ1b, and VCQ1b. A second virtual machine VM2 may include queues VSQ2a, VCQ2a, VSQ2b, and VCQ2b. The storage virtualization device 120 may include a first storage interface circuit. The first storage interface circuit may include queues SQ1a, CQ1a, SQ1b, and CQ1b. The first storage interface circuit may correspond to the first storage device 131.

In some embodiments, as illustrated in FIG. 6A, the queues VSQ1a, VCQ1a, VSQ1b, and VCQ1b of the first virtual machine VM1 may respectively correspond to the queues SQ1a, CQ1a, SQ1b, and CQ1b of the first storage interface circuit. That is, the first virtual machine VM1 may include a plurality of queues, the first storage interface circuit may include a plurality of queues, and the plurality of queues of the first virtual machine VM1 and the plurality of queues of the first storage interface circuit may have a correspondence relationship.

In FIG. 6A, the second virtual machine VM2 may be a virtual machine that is not used. For example, the second virtual machine VM2 may be generated and executed by CPU 111 of the host device 110 of FIG. 2, but may not use a storage device (e.g., at least one of a plurality of storage devices included in the storage device set 130). Resource allocation associated with queues VSQ2a, VCQ2a, VSQ2b, and VCQ2b of the second virtual machine VM2 may be released by the storage virtualization device 120 (e.g., mapping between the queues VSQ2a, VCQ2a, VSQ2b, and VCQ2b and a storage interface circuit may be released). In the case where there is a need to again use the second virtual machine VM2, the storage virtualization device 120 may again perform resource allocation on the queues VSQ2a, VCQ2a, VSQ2b, and VCQ2b of the second virtual machine VM2.

In some embodiments, as illustrated in FIG. 6B, the queues VSQ1a and VCQ1a of the first virtual machine VM1 may respectively correspond to the queues SQ1a and CQ1a of the first storage interface circuit. The queues VSQ2a and VCQ2a of the second virtual machine VM2 may respectively correspond to the queues SQ1b and CQ1b of the first storage interface circuit. That is, the first storage interface circuit may support the plurality of virtual machines VM1 and VM2.

In some embodiments, as illustrated in FIG. 6C, the queues VSQ1a, VCQ1a, VSQ1b, and VCQ1b of the first virtual machine VM1 may respectively correspond to the queues SQ1a, CQ1a, SQ1b, and CQ1b of the first storage interface circuit. The queues VSQ2a and VCQ2a of the second virtual machine VM2 may respectively correspond to the queues SQ1b and CQ1b of the first storage interface circuit. That is, the queue SQ1*b* of the first storage interface circuit may support the plurality of queues VSQ1*b* and VSQ2*a*. The queue CQ1*b* of the first storage interface circuit may support the plurality of queues VCQ1*b* and VCQ2*a*.

As described above, how to allocate resources of virtual machines are described with reference to FIGS. 6A, 6B, and 6C. According to embodiments of the present disclosure, the storage virtualization device 120 may provide flexible mapping between a storage device and a plurality of virtual machines. To manage the plurality of virtual machines, the storage virtualization device 120 may store and manage addresses for queues of the plurality of virtual machines. The storage virtualization device 120 may release resource allocation associated with queues of a virtual machine not used; in the case where there is a need to again use the virtual machine, the storage virtualization device 120 may perform resource allocation on the queues of the corresponding virtual machine.

Figure 7A:
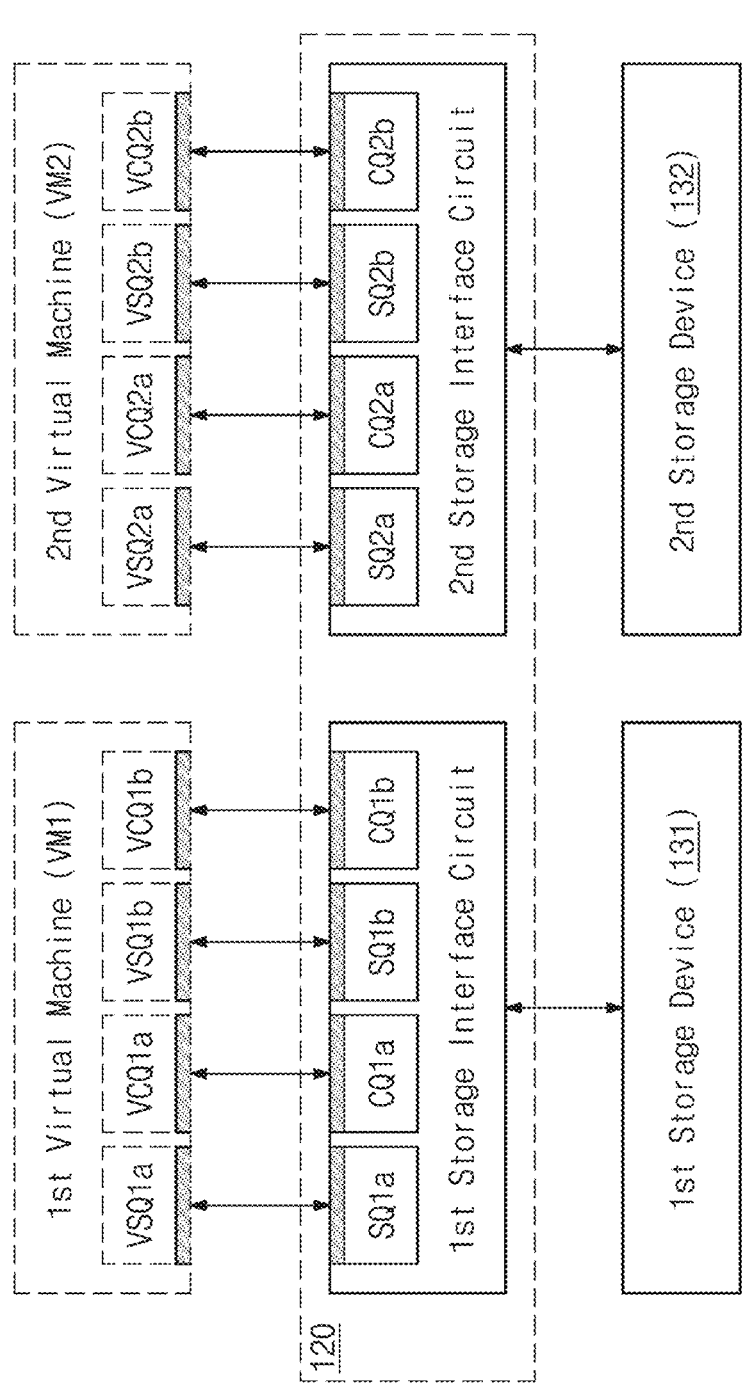
FIGS. 7A, 7B, and 7C are diagrams describing resource allocation between a plurality of virtual machines and a plurality of storage devices, according to some embodiments of the present disclosure.
Figure 7B:
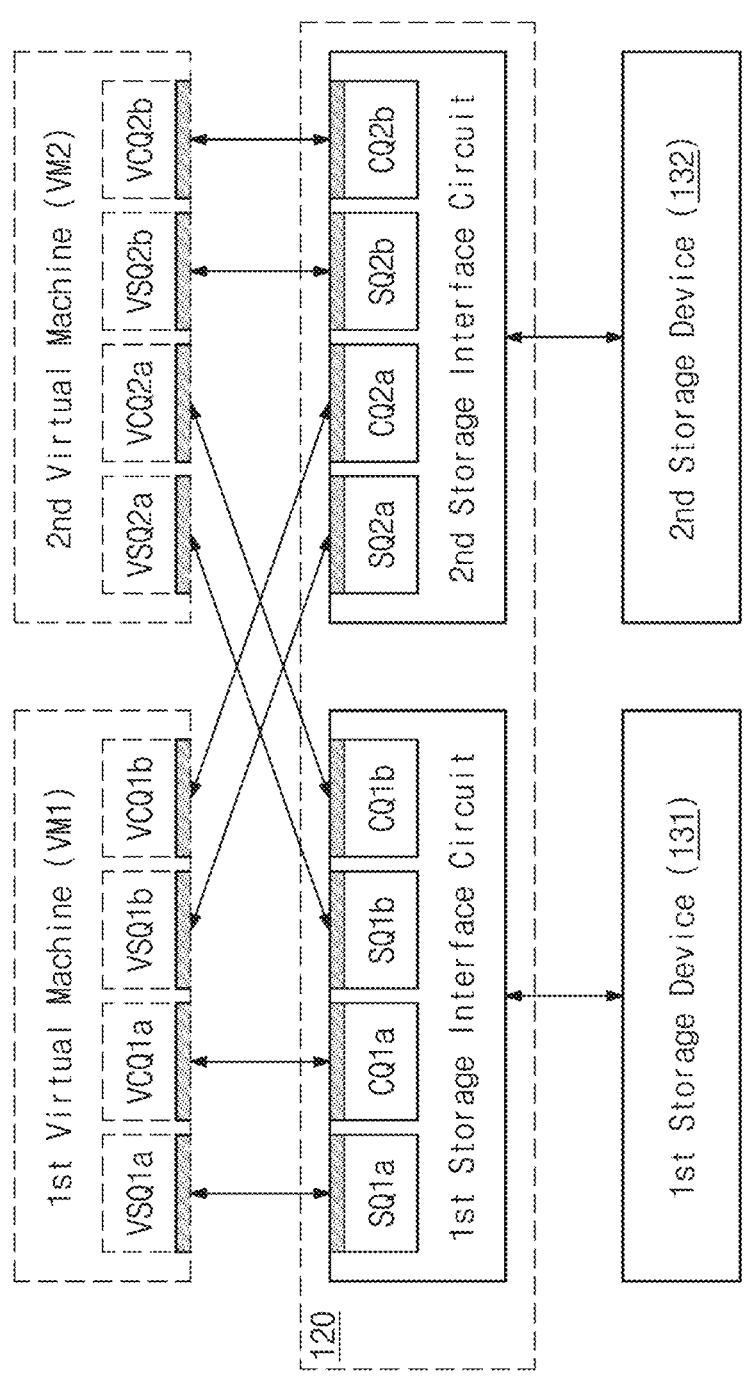
Figure 7C:
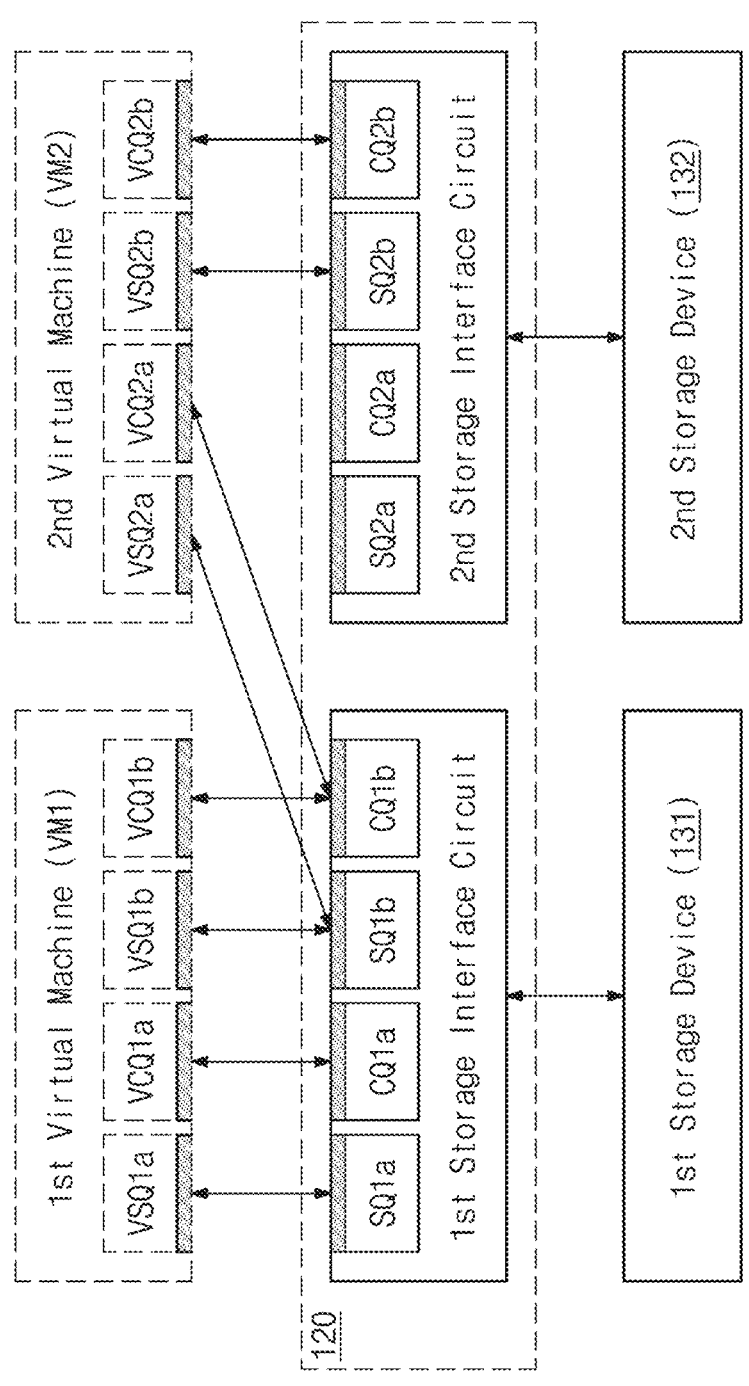

FIGS. 7A, 7B, and 7C are diagrams describing resource allocation between a plurality of virtual machines and a plurality of storage devices, according to some embodiments of the present disclosure. Referring to FIGS. 7A, 7B, and 7C, the first virtual machine VM1 may include the queues VSQ1*a*, VCQ1*a*, VSQ1*b*, and VCQ1*b*. The second virtual machine VM2 may include the queues VSQ2*a*, VCQ2*a*, VSQ2*b*, and VCQ2*b*. The storage virtualization device 120 may include first and second storage interface circuits. The first storage interface circuit may include the queues SQ1*a*, CQ1*a*, SQ1*b*, and CQ1*b*. The first storage interface circuit may correspond to the first storage device 131. The second storage interface circuit may include queues SQ2*a*, CQ2*a*, SQ2*b*, and CQ2*b*. The second storage interface circuit may correspond to the second storage device 132.

In some embodiments, as illustrated in FIG. 7A, the queues VSQ1*a*, VCQ1*a*, VSQ1*b*, and VCQ1*b* of the first virtual machine VM1 may respectively correspond to the queues SQ1*a*, CQ1*a*, SQ1*b*, and CQ1*b* of the first storage interface circuit. The queues VSQ2*a*, VCQ2*a*, VSQ2*b*, and VCQ2*b* of the second virtual machine VM2 may respectively correspond to the queues SQ2*a*, CQ2*a*, SQ2*b*, and CQ2*b* of the second storage interface circuit. That is, the storage virtualization device 120 may provide mapping between a plurality of virtual machines and a plurality of storage devices.

In some embodiments, as illustrated in FIG. 7B, the queues VSQ1*a* and VCQ1*a* of the first virtual machine VM1 may respectively correspond to the queues SQ1*a* and CQ1*a* of the first storage interface circuit. The queues VSQ1*b* and CQ1*b* of the first virtual machine VM1 may respectively correspond to the queues SQ2*a* and CQ2*a* of the second storage interface circuit. The queues VSQ2*a* and VCQ2*a* of the second virtual machine VM2 may respectively correspond to the queues SQ1*b* and CQ1*b* of the first storage interface circuit. The queues VSQ2*b* and VCQ2*b* of the second virtual machine VM2 may respectively correspond to the queues SQ2*b* and CQ2*b* of the second storage interface circuit. That is, the storage virtualization device 120 may provide flexible mapping between a plurality of virtual machines and a plurality of storage devices.

In some embodiments, as illustrated in FIG. 7C, the queues VSQ1*a*, VCQ1*a*, VSQ1*b*, and VCQ1*b* of the first virtual machine VM1 may respectively correspond to the queues SQ1*a*, CQ1*a*, SQ1*b*, and CQ1*b* of the first storage interface circuit. The queues VSQ2*a* and VCQ2*a* of the second virtual machine VM2 may respectively correspond to the queues SQ1*b* and CQ1*b* of the first storage interface circuit. The queues VSQ2*b* and VCQ2*b* of the second virtual machine VM2 may respectively correspond to the queues SQ2*b* and CQ2*b* of the second storage interface circuit. That is, the storage virtualization device 120 may provide flexible mapping between a plurality of virtual machines and a plurality of storage devices.

As described above, resource allocation between virtual machines and storage devices are described with reference to FIGS. 7A, 7B, and 7C. According to embodiments of the present disclosure, the storage virtualization device 120 may provide flexible mapping between a plurality of virtual machines and a plurality of storage devices. The storage virtualization device 120 may send commands (e.g., a read command and a write command) of the same virtual machine to different storage devices. The storage virtualization device 120 may send completions from the same storage device to different virtual machines. In the case where a new storage device is added, the storage virtualization device 120 may perform flexible resource allocation on an existing storage device and the added storage device or may flexibly release the resource allocation.

Figure 8:
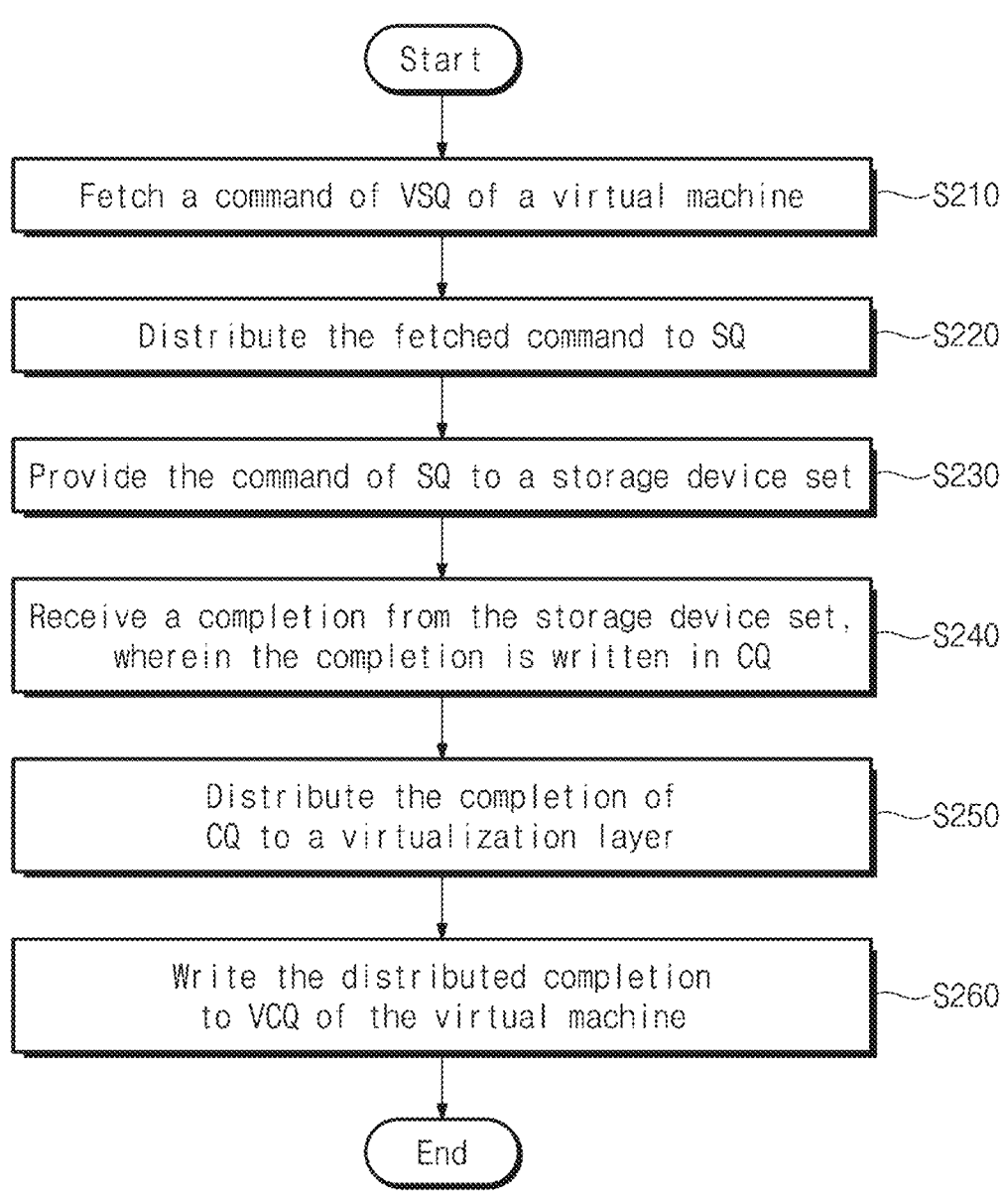
FIG. 8 is a flowchart describing an operation method of a storage virtualization device, according to some embodiments of the present disclosure.

FIG. 8 is a flowchart describing an operation method of a storage virtualization device, according to some embodiments of the present disclosure. An operation method of a storage virtualization device will be described with reference to FIG. 8. The storage virtualization device may correspond to the storage virtualization device 120 of FIGS. 1, 2, 3, 5, 6A, 6B, 6C, 7A, 7B, and 7C. The storage virtualization device may communicate with a host device and a storage device set. The storage virtualization device may include an SQ and a CQ. The storage virtualization device may support a virtual machine executable by the host device. The virtual machine may include a VSQ and a VCQ.

In operation S210, the storage virtualization device may fetch a command of the VSQ of the virtual machine. In some embodiments, operation S210 may include receiving, from the host device, a doorbell indicating that a command is written in the VSQ, making a request to the host device for the command of the VSQ in response to the doorbell, and receiving the command of the VSQ as a response to the request from the host device.

In operation S220, the storage virtualization device may distribute the fetched command to the SQ. The VSQ of the virtual machine and the SQ of the storage virtualization device may be mapped. The storage virtualization device may manage the mapping between the VSQ and the SQ. In some embodiments, operation S220 may include translating a virtual address of the virtual machine, which is included in the command of the SQ, into a physical address of the host device.

In operation S230, the storage virtualization device may provide the command of the SQ to the storage device set. The storage device set may process the command of the SQ. For example, the storage device set may process the command of the SQ by communicating data with the DMA buffer of the virtual machine.

In operation S240, the storage virtualization device may receive a completion from the storage device set. The completion may be written in the CQ of the storage virtualization device. The completion may indicate that the command of the SQ in operation S230 is processed.

In operation S250, the storage virtualization device may distribute the completion of the CQ to a virtualization layer. The VSQ of the virtual machine and the CQ of the storage virtualization device may be mapped. The storage virtualization device may manage the mapping between the VCQ and the CQ.

In operation S260, the storage virtualization device may write the distributed completion to the VCQ of the virtual machine. In some embodiments, operation S260 may further include receiving a first doorbell indicating that the completion written in the VCQ is processed, from the host device, and outputting a second doorbell indicating that the completion written in the CQ is processed, to the storage device set, based on the first doorbell.

Figure 9:
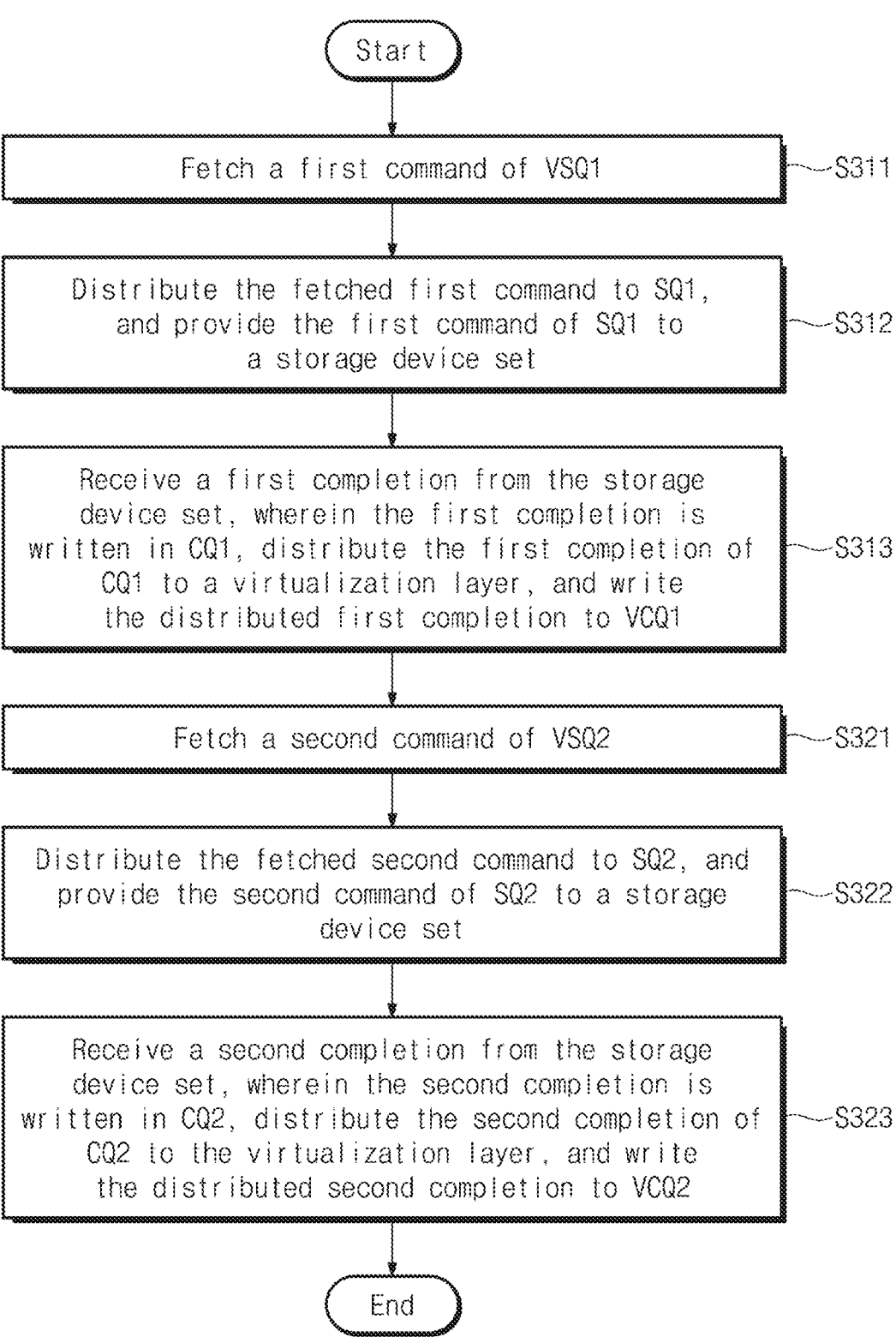
FIG. 9 is a flowchart describing an operation method of a storage virtualization device, according to some embodiments of the present disclosure.

FIG. 9 is a flowchart describing an operation method of a storage virtualization device, according to some embodiments of the present disclosure. An operation method of a storage virtualization device will be described with reference to FIG. 9. The storage virtualization device may correspond to the storage virtualization device 120 of FIGS. 1, 2, 3, 5, 6A, 6B, 6C, 7A, 7B, and 7C. The storage virtualization device may communicate with a host device and a storage device set. The storage virtualization device may include a first SQ SQ1, a first CQ CQ1, a second SQ SQ2, and a second CQ CQ2. The storage virtualization device may support a plurality of virtual machines executable by the host device. Each of the plurality of virtual machines may include a first VSQ VSQ1, a first VCQ VCQ1, a second VSQ VSQ2, and a second VCQ VCQ2.

In operation S311, the storage virtualization device may fetch a first command of the first VSQ VSQ1. In operation S312, the storage virtualization device may distribute the first command thus fetched to the first SQ SQ1 and may provide the first command of the first SQ SQ1 to the storage device set.

In operation S313, the storage virtualization device may receive a first completion from the storage device set. The first completion may be written in the first CQ CQ1 of the storage virtualization device. The first completion may indicate that the command of the first SQ SQ1 in operation S312 is processed. The storage virtualization device may distribute the first completion of the first CQ CQ1 to the virtualization layer. The storage virtualization device may write the first completion thus distributed, to the first VCQ VCQ1.

In operation S321, the storage virtualization device may fetch a second command of the second VSQ VSQ2. In operation S322, the storage virtualization device may distribute the second command thus fetched to the second SQ SQ2 and may provide the second command of the second SQ SQ2 to the storage device set.

In operation S323, the storage virtualization device may receive a second completion from the storage device set. The second completion may be written in the second CQ CQ2 of the storage virtualization device. The second completion may indicate that the command of the second SQ SQ2 in operation S322 is processed. The storage virtualization device may distribute the second completion of the second CQ CQ2 to the virtualization layer. The storage virtualization device may write the second completion thus distributed, to the second VCQ VCQ2.

In some embodiments, the storage virtualization device may provide a plurality of mapping with regard to one virtual machine and one storage device. For example, the queues VSQ1, VCQ1, VSQ2, and VCQ2 may be included in the same virtual machine of the plurality of virtual machine. The queues SQ1, CQ1, SQ2, and CQ2 may correspond to the same storage device in the storage device set.

In some embodiments, the storage virtualization device may provide a plurality of mapping with regard to one virtual machine and a plurality of storage devices. For example, the queues VSQ1, VCQ1, VSQ2, and VCQ2 may be included in the same virtual machine of the plurality of virtual machine. The queues SQ1 and CQ1 may correspond to a first storage device in the storage device set. The queues SQ2 and CQ2 may correspond to a second storage device in the storage device set.

In some embodiments, the storage virtualization device may provide a plurality of mapping with regard to a plurality of virtual machines and one storage device. For example, the queues VSQ1 and VCQ1 may be included in a first virtual machine of the plurality of virtual machine. The queues VSQ2 and VCQ2 may be included in a second virtual machine of the plurality of virtual machine. The queues SQ1, CQ1, SQ2, and CQ2 may correspond to the same storage device in the storage device set.

In some embodiments, the storage virtualization device may provide a plurality of mapping with regard to a plurality of virtual machines and a plurality of storage devices. For example, the queues VSQ1 and VCQ1 may be included in a first virtual machine of the plurality of virtual machine. The queues VSQ2 and VCQ2 may be included in a second virtual machine of the plurality of virtual machine. The queues SQ1 and CQ1 may correspond to a first storage device in the storage device set. The queues SQ2 and CQ2 may correspond to a second storage device in the storage device set.

According to an embodiment of the present disclosure, a storage virtualization device supporting a virtual machine, an operation method thereof, and an operating method of a system including the same are provided.

Also, a storage virtualization device, which supports a virtualization layer for a virtual machine such as a resource of a CPU is saved, a data rate is improved, a flexible resource management function and a flexible virtual machine management function are provided, an operation method thereof, and an operation method of a system including the same are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a storage virtualization device which is a hardware device separate from a host device and a storage device set, communicates with the host device and the storage device set, includes first and second submission queues (SQs) and first and second completion queues (CQs), and supports first and second virtual machines executable by the host device, the method comprising:

fetching a first command of a first virtual submission queue (VSQ) of the first virtual machine and a second command of a second VSQ of the second virtual machine, wherein the first and second virtual machines are located external to the storage virtualization device;

distributing the fetched first and second commands to any of the first and second SQs according to a flexible mapping including allocating and reallocating the first and second SQs and the first and second CQs between the first and second virtual machines and the storage device set;

providing the distributed first and second commands to a corresponding one of a first storage device and a second storage device of the storage device set;

receiving, from the corresponding one of the first and second storage devices, a first completion indicating that the first command is processed and a second completion indicating that the second command is processed, wherein the first and second completions are written in a corresponding one of the first and second CQs;

distributing the first and second completions of the first and second CQs to a virtualization layer; and writing the distributed first and second completions to a corresponding one of a first virtual completion queue (VCQ) of the first virtual machine and a second VCQ of the second virtual machine, wherein the flexible mapping further includes releasing an allocation of the first and second SQs and the first and second CQs for the second VSQ and the second VCQ of the second virtual machine by the storage virtualization device when the second virtual machine does not use the first and second storage devices.

2. The method of claim 1, wherein:

the storage virtualization device further includes a first storage interface circuit corresponding to the first storage device and a second storage interface circuit corresponding to the second storage device, the first storage interface circuit includes the first and second SQs and the first and second CQs, and the second storage interface circuit includes third and fourth SQs and third and fourth CQs, the first virtual machine includes the first VSQ and a third VSQ and the second virtual machine includes the second VSQ and a fourth VSQ, and the first virtual machine includes the first VCQ and a third VCQ and the second virtual machine includes the second VCQ and a fourth VCQ, the method further comprises:

allocating the first and second SQs and the first and second CQs of the first storage interface circuit to the first and third VSQs and the first and third VCQs of the first virtual machine; and allocating the third and fourth SQs and the third and fourth CQs of the second storage interface circuit to the second and fourth VSQs and the second and fourth VCQs of the second virtual machine.

3. The method of claim 1, wherein:

the storage virtualization device further includes a first storage interface circuit corresponding to the first storage device and a second storage interface circuit corresponding to the second storage device, the first storage interface circuit includes the first and second SQs and the first and second CQs, and the second storage interface circuit includes third and fourth SQs and third and fourth CQs, the first virtual machine includes the first VSQ and a third VSQ and the second virtual machine includes the second VSQ and a fourth VSQ, and the first virtual machine includes the first VCQ and a third VCQ and the second virtual machine includes the second VCQ and a fourth VCQ, the method further comprises:

allocating the first SQ and the first CQ of the first storage interface circuit to the first VSQ and the first VCQ of the first virtual machine;

allocating the second SQ and the second CQ of the first storage interface circuit to the second VSQ and the second VCQ of the second virtual machine;

allocating the third SQ and the third CQ of the second storage interface circuit to the third VSQ and the third VCQ of the first virtual machine; and allocating the fourth SQ and the fourth CQ of the second storage interface circuit to the fourth VSQ and the fourth VCQ of the second virtual machine.

4. The method of claim 1, wherein:

the storage virtualization device further includes a first storage interface circuit corresponding to the first storage device and a second storage interface circuit corresponding to the second storage device, the first storage interface circuit includes the first and second SQs and the first and second CQs, and the second storage interface circuit includes third and fourth SQs and third and fourth CQs, the first virtual machine includes the first VSQ and a third VSQ and the second virtual machine includes the second VSQ and a fourth VSQ, and the first virtual machine includes the first VCQ and a third VCQ and the second virtual machine includes the second VCQ and a fourth VCQ, the method further comprises:

allocating the first SQ and the first CQ of the first storage interface circuit to the first VSQ and the first VCQ of the first virtual machine;

allocating the second SQ and the second CQ of the first storage interface circuit to the third VSQ and the third VCQ of the first virtual machine and the second VSQ and the second VCQ of the second virtual machine; and allocating the fourth SQ and the fourth CQ of the second storage interface circuit to the fourth VSQ and the fourth VCQ of the second virtual machine.

5. The method of claim 1, wherein:

the storage virtualization device further includes a first storage interface circuit corresponding to the first storage device, wherein the first storage interface circuit includes the first SQ, the first CQ, the second SQ, and the second CQ, and the method further comprises:

allocating the first SQ and the first CQ of the first storage interface circuit to the first VSQ and the first VCQ of the first virtual machine; and allocating the second SQ and the second CQ of the first storage interface circuit to the second VSQ and the second VCQ of the second virtual machine.

6. The method of claim 1, wherein:

the storage virtualization device further includes a first storage interface circuit corresponding to the first storage device, wherein the first storage interface circuit includes the first SQ, the first CQ, the second SQ, and the second CQ, the first virtual machine includes the first VSQ and a third VSQ and the second virtual machine includes the second VSQ and a fourth VSQ, and the first virtual machine includes the first VCQ and a third VCQ and the second virtual machine includes the second VCQ and a fourth VCQ, the method further comprises:

allocating the first and second SQs and the first and second CQs of the first storage interface circuit to the first and third VSQs and the first and third VCQs of the first virtual machine; and allocating the second SQ and the second CQ of the first storage interface circuit to the second VSQ and the second VCQ of the second virtual machine.

7. The method of claim 1, wherein the fetching of the first command of the first VSQ of the first virtual machine and the second command of the second VSQ of the second virtual machine includes:

receiving, from the host device, a first doorbell indicating that the first command is written in the first VSQ;

outputting a first request for the first command of the first VSQ to the host device based on the first doorbell; and fetching the first command of the first VSQ of the first virtual machine from the host device.

8. The method of claim 7, wherein the storage virtualization device further communicates with an input/output (I/O) memory management unit, wherein the outputting of the first request for the first command of the first VSQ to the host device based on the first doorbell includes:

outputting the first request of the first command of the first VSQ to the host device through the I/O memory management unit, based on the first doorbell and a first physical address, wherein the first physical address is generated by translating a first virtual address corresponding to the first request of the first command of the first VSQ, and wherein the fetching of the first command of the first VSQ of the first virtual machine from the host device includes:

fetching the first command of the first VSQ of the first virtual machine from the host device without address translation by the I/O memory management unit.

9. The method of claim 1, wherein the storage virtualization device further communicates with an input/output (I/O) memory management unit, and wherein the writing of the distributed first and second completions to any of the first VCQ of the first virtual machine and the second VCQ of the second virtual machine includes:

writing the distributed first completion to the first VCQ of the first virtual machine through the I/O memory management unit, based on a second physical address, wherein the second physical address is generated by translating a second virtual address corresponding to the distributed first completion.

10. The method of claim 1, wherein the distributing of the fetched first and second commands to any of the first and second SQs includes:

translating a third virtual address of a direct memory access (DMA) buffer of the first virtual machine, which is included in the fetched first command, into a third physical address.

11. The method of claim 1, wherein the providing of the distributed first and second commands to a corresponding one of the first and second storage devices of the storage device set includes:

outputting a second doorbell, which indicates that the first command is written in the first SQ, to a doorbell register of the first storage device of the storage device set;

receiving a second request for the first command written in the first SQ from the first storage device; and outputting a response including the first command written in the first SQ to the first storage device based on the second request.

12. The method of claim 1, further comprising:

receiving, from the host device, a third doorbell indicating that the first completion written in the first VCQ is processed.

13. The method of claim 12, further comprising:

outputting a fourth doorbell, which indicates that the first completion written in the first CQ is processed, to a doorbell register of the first storage device of the storage device set, based on the third doorbell.

14. The method of claim 1, wherein the storage virtualization device is implemented with a field programmable gate array (FPGA).

15. A storage virtualization device, which is a hardware device separate from a host device and a storage device set, communicates with the host device and the storage device set and supports a first virtual machine and a second virtual machine executable by the host device, the storage virtualization device comprising:

a single root input/output virtualization (SR-IOV) adapter configured to communicate with the host device and to provide an interface with the first and second virtual machines located external to the storage virtualization device;

a first storage virtualization core and a second storage virtualization core configured to fetch a first command and a second command of a first virtual submission queue (VSQ) of the first virtual machine and a second VSQ of the second virtual machine;

an interposition layer including mapping information between the first and second virtual machines and first and second storage devices of the storage device set; and a first storage interface circuit including a first submission queue (SQ) and a first completion queue (CQ) and a second storage interface circuit including a second SQ and a second CQ, wherein the first storage interface circuit is configured to communicate with the first storage device and the second storage interface circuit is configured to communicate with the second storage device, wherein the first and second storage circuits are further configured to:

provide a corresponding one of the first and second storage devices with the first and second commands distributed to any of the first and second SQs from the first and second storage virtualization cores through the interposition layer according to a flexible mapping including allocating and reallocating the first and second SQs and the first and second CQs between the first and second virtual machines and the first and second storage devices;

receive, from the corresponding one of first and second storage devices, a first completion indicating that the first command is processed and a second completion indicating that the second command is processed, wherein the first and second completions are written in a corresponding one of the first and second CQs; and distribute the first and second completions of the corresponding one of the first and second CQs to a virtualization layer through the interposition layer, and wherein the first and second storage virtualization cores are further configured to:

write the distributed first and second completions to a corresponding one of a first virtual completion queue (VCQ) of the first virtual machine and a second VCQ of the second virtual machine, and wherein the flexible mapping further includes releasing an allocation of the first and second SQs and the first and second CQs for the second VSQ and the second VCQ of the second virtual machine by the storage virtualization device when the second virtual machine does not use the first and second storage devices.

16. The storage virtualization device of claim 15, further comprising:

a doorbell register configured to receive a first doorbell corresponding to the first command from the host device through the SR-IOV adapter and to notify the first storage virtualization core that the first command is written in the first VSQ;

a table configured to communicate with the first storage virtualization core, wherein the table includes second mapping information between a virtual address of a direct memory access (DMA) buffer of the first virtual machine and a physical address corresponding to the host device; and a DMA engine configured to support processing of the first command between the host device and the storage device set.

17. An operation method of a storage system including a host device, a storage virtualization device, and a storage device set, the host device executing a plurality of virtual machines, the storage virtualization device being a hardware device separate from the host device and the storage device set, supporting the plurality of virtual machines and including a plurality of storage interface circuits having at least one submission queue (SQ) and at least one completion queue (CQ), respectively, the storage device set including a plurality of storage devices communicating with a corresponding one of the storage interface circuits, the method comprising:

generating, by the host device, a doorbell indicating that a command is written in virtual submission queues (VSQs) of the virtual machines located external to the storage virtualization device;

fetching, by the storage virtualization device, the commands of the VSQs;

distributing, by the plurality of storage interface circuits, the fetched commands to any of the SQs according to a flexible mapping including allocating and reallocating the at least one SQ and the at least one CQ between the plurality of virtual machines and the plurality of storage devices;

providing, by the plurality of storage interface circuits, the distributed commands to a corresponding storage device among the plurality of storage devices, respectively;

processing, by the storage device set and the host device, the commands;

writing, by the storage device set, a plurality of completions indicating that a corresponding command among the commands is processed, to a corresponding CQ among the CQs, respectively;

distributing, by the storage virtualization device, the completions of the CQs to a virtualization layer; and writing, by the storage virtualization device, the distributed completions to a corresponding one of virtual completion queues (VCQs) of the virtual machines, wherein the flexible mapping further includes releasing an allocation of the at least one SQ and the at least one CQ for a corresponding one of the VSQs and VCQs of a virtual machine by the storage virtualization device when the virtual machine does not use a corresponding one of the storage devices.

18. The method of claim 17, wherein the storage system further includes an input/output (I/O) memory management unit communicating with the host device and the storage virtualization device, wherein the fetching of the commands of the VSQs of the virtual machines by the storage virtualization device includes the fetching of a first command, wherein the fetching includes:

generating, by the storage virtualization device, a request for the first command based on the doorbell;

translating, by the I/O memory management unit, a first virtual address corresponding to the request for the first command into a first physical address; and providing, by the host device, the first command to the storage virtualization device based on the first physical address and the request, and wherein the writing of the distributed completions to the corresponding one of VCQs of the virtual machines by the storage virtualization device includes:

providing, by the storage virtualization device, the distributed completion to the I/O memory management unit;

translating, by the I/O memory management unit, a second virtual address corresponding to the distributed completion into a second physical address; and storing, by the host device, the distributed completion to the corresponding one of the VCQs based on the second physical address.

* * * * *